United States Patent [19]

Hatanaka et al.

[11] Patent Number: 5,638,114

[45] Date of Patent: Jun. 10, 1997

[54] MULTI-LOCATION CONTROL APPARATUS, TELEVISION CONFERENCE TERMINAL UNIT, AND MULTI-LOCATION TELEVISION CONFERENCE SYSTEM

[75] Inventors: Masanobu Hatanaka; Hitoshi Takei; Shoichi Sano; Hiroaki Natori; Reiko Okazaki; Shoichi Tamuki, all of Kawasaki, Japan

[73] Assignee: Fujitsu Limited, Kawasaki, Japan

[21] Appl. No.: 214,316

[22] Filed: Mar. 17, 1994

[30] Foreign Application Priority Data

Apr. 7, 1993 [JP] Japan .................................. 5-080933

[51] Int. Cl.$^6$ .................................................. H04N 7/14
[52] U.S. Cl. ............................ 348/15; 348/12; 348/13; 348/14; 455/5.1
[58] Field of Search ............................ 348/12–16, 6, 348/17; 455/5.1, 3.1

[56] References Cited

U.S. PATENT DOCUMENTS 4,531,024  7/1985  Colton et al. .
5,382,972  1/1995  Kannes ........................ 348/15

FOREIGN PATENT DOCUMENTS 351 757  1/1990  European Pat. Off. .

OTHER PUBLICATIONS

Tanigawa et al, "Personal Multimedia–Multipoint Teleconference System," IEEE Infocom '91—The Conference on Computer Communications–Proceedings, vol. 3, USA.

*Primary Examiner*—John K. Peng
*Assistant Examiner*—Nathan J. Flynn
*Attorney, Agent, or Firm*—Staas & Halsey

[57] ABSTRACT

In a multi-location television conference system that connects five locations A, B, C, D, and E, when speeches take place at the four locations A, B, C, and D at the same time, at a listening location E, images of all the speaking locations A, B, C, and D are displayed on one screen with four divided screen areas. On the other hand, at the speaking location A, images of the speaking locations B, c, and D and an image of the former speaking location E are displayed on one screen with four divided screen areas. In addition, when images of speaking locations are displayed, locations names thereof are also displayed. Thus, a television conference held at a plurality of locations at a time can be smoothly managed as with a real conventional conference.

5 Claims, 35 Drawing Sheets

| IMAGE AT LOCATION A | IMAGE AT LOCATION B |
|---|---|
| IMAGE AT LOCATION C | IMAGE AT LOCATION D |

DISPLAY SCREEN AT LOCATION E
(DISPLAY SCREEN AT LISTENING LOCATION)

FIG. 15A

| IMAGE AT LOCATION E | IMAGE AT LOCATION B |
|---|---|
| IMAGE AT LOCATION C | IMAGE AT LOCATION D |

DISPLAY SCREEN AT LOCATION A
(DISPLAY SCREEN AT SPEAKING LOCATION)

FIG. 15B

| IMAGE AT LOCATION A | IMAGE AT LOCATION B |
|---|---|
|  |  |

DISPLAY SCREEN AT LOCATIONS C, D AND E
(DISPLAY SCREEN AT LISTENING LOCATIONS)

FIG. 16A

| IMAGE AT LOCATION E | IMAGE AT LOCATION B |
|---|---|
|  |  |

DISPLAY SCREEN AT LOCATION A
(DISPLAY SCREEN AT SPEAKING LOCATION)

FIG. 16B

DISPLAY SCREEN AT LOCATIONS B, C, D AND E
(DISPLAY SCREEN AT LISTENING LOCATIONS)

FIG. 17A

DISPLAY SCREEN AT LOCATION A
(DISPLAY SCREEN AT SPEAKING LOCATION)

| CONFERENCE ROOM NUMBER | DESIGNATED MODE | AUTOMATIC CONFERENCE ROOM SWITCHING | CHAIRMAN |
|---|---|---|---|
| 1(A) | NS/PS DESIGNATING | — | ○ |
| 2(B) | INDEPENDENT DESIGNATING | ENABLE | |
| 3(C) | INDEPENDENT DESIGNATING | DISABLE | |
| 4(D) | NS/PS DESIGNATING | — | |
| ⋮ | | | |
| N(X) | NS/PS DESIGNATING | — | |

FIG. 27

| CONFERENCE ROOM NUMBER | NS/PS |
|---|---|
| 1(A) | NS |
| 2(B) | S |
| 3(C) | S |
| 4(D) | PS |
| ⋮ | |
| N(X) | S |

FIG. 28

| CONFERENCE ROOM NUMBER | DISPLAYING CONFERENCE ROOM |
|---|---|
| 1(A) | D |
| 2(B) | C |
| 3(C) | D |
| 4(D) | A |
| ⋮ | |
| N(X) | A |

|  | | OUTPUT | | | | | |
|---|---|---|---|---|---|---|---|
|  |  | A | B | C | D |  | X |
| INPUT | A | X | X | X | 0 |  | 0 |
|  | B | X | X | X | X |  | X |
|  | C | X | 0 | X | X |  | X |
|  | D | 0 | X | 0 | X |  | X |
|  |  |  |  |  |  |  |  |
|  | X | X | X | X | X | X | X |

| CONFERENCE ROOM NUMBER | NS/PS |
|---|---|
| 1(A) | PS |
| 2(B) | S |
| 3(C) | S |
| 4(D) | S |
| ⋮ | |
| N(X) | NS |

NS/PS MANAGEMENT TABLE

FIG. 31B

| CONFERENCE ROOM NUMBER | CONFERENCE ROOM NUMBER |
|---|---|
| 1(A) | X |
| 2(B) | X |
| 3(C) | D |
| 4(D) | X |
| ⋮ | |
| N(X) | A |

DISPLAYING CONFERENCE ROOM MANAGEMENT TABLE

FIG. 31C

| | | OUTPUT | | | | | |
|---|---|---|---|---|---|---|---|
| | | A | B | C | D | ⋮ | X |
| INPUT | A | × | × | × | × | | ○ |
| | B | × | × | × | × | | × |
| | C | × | × | × | × | | × |
| | D | × | × | ○ | × | | × |
| | ⋮ | | | | | | |
| | X | ○ | ○ | × | ○ | | × |

MATRIX SWITCHER STATUS TABLE

FIG. 33A

| CONFERENCE ROOM NUMBER | DISPLAYING CONFERENCE ROOM |
|---|---|
| 1 (A) | D |
| 2 (B) | X |
| 3 (C) | D |
| 4 (D) | A |
| ·· | |
| N ( ) | A |

FIG. 33B

| | | OUTPUT | | | | |
|---|---|---|---|---|---|---|
| | | A | B | C | D | ... | X |
| INPUT | A | X | X | X | O | ... | X |
| | B | X | X | X | X | ... | O |
| | C | X | X | O | X | ... | X |
| | D | O | X | X | X | ... | X |
| | ... | | | | | | |
| | X | X | O | X | X | ... | X |

FIG. 34A

| CONFERENCE ROOM NUMBER | NS/PS |
|---|---|
| 1 (A) | NS |
| 2 (B) | S |
| 3 (C) | S |
| 4 (D) | S |
| .. | |
| N (X) | PS |

FIG. 34B

| CONFERENCE ROOM NUMBER | CONFERENCE ROOM NUMBER |
|---|---|
| 1 (A) | X |
| 2 (B) | C |
| 3 (C) | D |
| 4 (D) | A |
| .. | |
| N (X) | A |

FIG. 34C

| INPUT \ OUTPUT | A | B | C | D | ... | X |
|---|---|---|---|---|---|---|
| A | X | X | X | X | ... | O |
| B | X | X | O | X | ... | X |
| C | X | X | X | O | ... | X |
| D | O | X | X | X | ... | X |
| ... | | | | | | |
| X | O | X | X | X | ... | X |

FIG. 35A

| CONFERENCE ROOM NUMBER | NS/PS |
|---|---|
| 1 (A) | PS |
| 2 (B) | S |
| 3 (C) | S |
| 4 (D) | S |
| .. |  |
| N (X) | NS |

FIG. 35B

| CONFERENCE ROOM NUMBER | CONFERENCE ROOM NUMBER |
|---|---|
| 1 (A) | X |
| 2 (B) | C |
| 3 (C) | D |
| 4 (D) | X |
| .. |  |
| N (X) | A |

FIG. 35C

| INPUT \ OUTPUT | A | B | C | D | ... | X |
|---|---|---|---|---|---|---|
| A | X | X | X | X | ... | O |
| B | X | X | O | X | ... | X |
| C | X | X | X | O | ... | X |
| D | X | X | X | X | ... | O |
| ... |  |  |  |  |  |  |
| X | O | X | X | X | ... | X |

FIG. 37A

| CONFERENCE ROOM NUMBER | DESIGNATED MODE | AUTOMATIC CONFERENCE ROOM SWITCHING | CHAIRMAN |
|---|---|---|---|
| 1 (A) | NS/PS DESIGNATING | — | O |
| 2 (B) | NS/PS DESIGNATING | — | |
| 3 (C) | INDEPENDENT DESIGNATING | DISABLE | |
| 4 (D) | NS/PS DESIGNATING | — | |
| ·· | | | |
| N ( ) | NS/PS DESIGNATING | — | |

FIG. 37B

| NS/PS |
|---|
| NS |
| S |
| S |
| PS |
| |
| S |

FIG. 37C

| DISPLAYING CONFERENCE ROOM |
|---|
| D |
| A |
| D |
| A |
| |
| A |

FIG. 37D

| | | OUTPUT | | | | |
|---|---|---|---|---|---|---|
| | | A | B | C | D | | X |
| INPUT | A | X | O | X | X | | X |
| | B | X | X | X | O | | X |
| | C | X | X | X | X | | X |
| | D | O | X | O | X | | X |
| | | | | | | | |
| | X | X | X | X | X | | X |

| CONFERENCE ROOM NUMBER | DESIGNATED MODE | AUTOMATIC CONFERENCE ROOM SWITCHING | CHAIRMAN |
|---|---|---|---|
| 1 (A) | NS/PS DESIGNATING | — | O |
| 2 (B) | INDEPENDENT DESIGNATING | ENABLE | |
| 3 (C) | INDEPENDENT DESIGNATING | DISABLE | |
| 4 (D) | NS/PS DESIGNATING | ENABLE | |
| ⋮ | | | |
| N (X) | NS/PS DESIGNATING | — | |

FIG. 38

FIG. 42
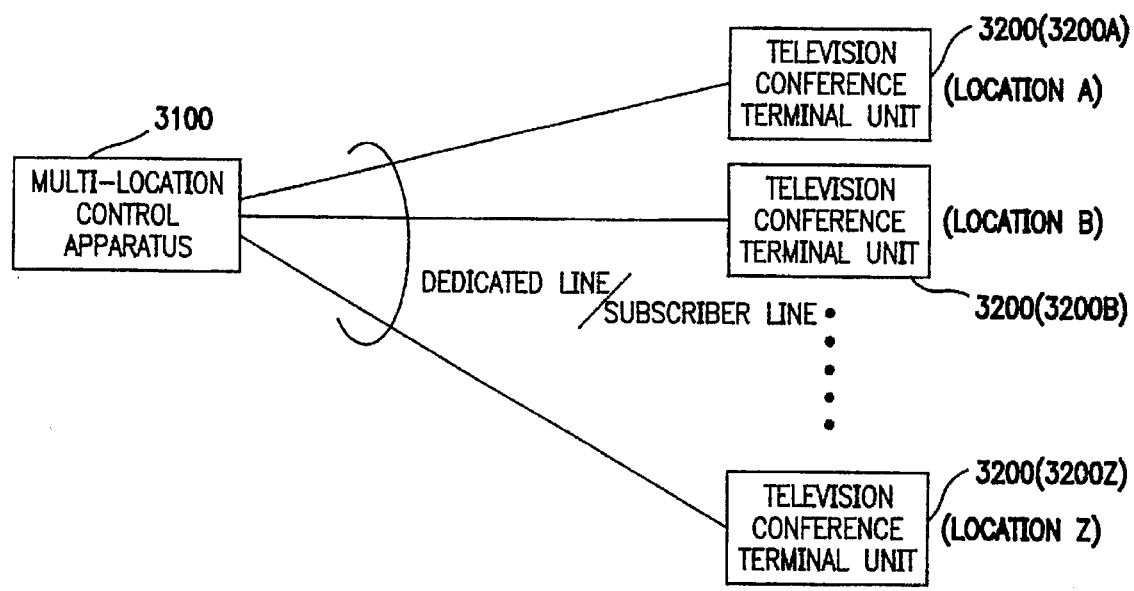
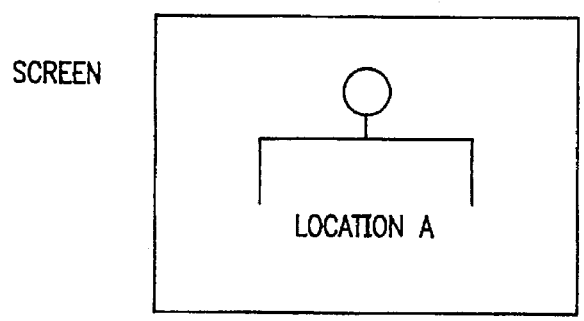
FIG. 43

MULTI-LOCATION CONTROL APPARATUS, TELEVISION CONFERENCE TERMINAL UNIT, AND MULTI-LOCATION TELEVISION CONFERENCE SYSTEM

BACKGROUND OF THE INVENTION

1. Field of the Invention

The present invention relates to a television conference system for use during a multi-location television conference.

2. Description of the Related Art

In recent years, with the advent of ISDN (Integrated Services Digital Networks), digital networks have been widely used and television conference systems have become popular.

The television conference systems transmit image data and sound data among remote locations so as to hold conferences. Conventional television conference systems transmit image data and sound data between two locations (namely, point-to-point connection). Recently, to more effectively hold conferences, a multi-location television conference system as shown in FIG. 1 has gained public attention. The needs of multi-location television conference systems result from geographical distribution of offices (such as main office, works, laboratories, sales offices) of companies. In this situation, so as to reduce cost and time necessary for transmitting information, people, and materials, television conferences have been held among television conference terminal units disposed at remote locations.

FIG. 1 is a schematic diagram showing an overall construction of a multi-location television conference system that holds a television conference among conference rooms A, B, C, and D disposed at four locations.

In the drawing, reference numerals 1 to 4 refer to television conference terminal units disposed at the four conference rooms. Reference numeral 10 refers to a multi-location control apparatus disposed at a center station.

The television conference terminal units (that may be hereinafter referred to as terminal units) 1 to 4 each have a camera, a monitor, a microphone, an encoding unit, and so forth. Thus, the television conference terminal units each have input and output functions of image data and sound data. Image data and sound data of each conference room are sent to the center unit 10. The center unit 10 sends the image data and sound data to each of the television conference terminal units.

The center unit 10 receives image data and sound data from all the conference rooms, mixes all the sound data, sends the mixed sound data to the television conference terminal units 1 to 4, and distributes the image data to all the television conference terminal units.

In this multi-location television conference system, a monitor of the television conference terminal unit at each conference room (location) switches and displays images of other conference rooms (of at least one location). When a speaking location is detected, the image thereof is automatically displayed. Thus, the monitor of each conference room displays at least an image of a speaking location. (However, the monitor of a speaking location displays an image of a former speaking location.)

A switching and displaying type multi-location control apparatus that distributes an image of one conference room to television conference terminal units of other conference rooms is known. This multi-location control apparatus can be easily introduced because the television conference terminal units for use with the point-to-point connection type television conference system can be used as they are. Thus, the switching and displaying type multi-location control apparatus has been widely developed and fabricated.

Moreover, a multi-location control apparatus having a new station (NS)/past station (PS) designating mode is known.

Conventionally, an image switching operation in the NS/PS designating mode is automatically performed when the television conference terminal unit at each location is operated. Alternately, this operation is automatically performed when the multi-location control apparatus detects a speaking attendant. This function is referred to as the speaking attendant detecting function. With this function, the multi-location control apparatus distributes image data of the speaking location (NS) to the television conference terminal units at other locations. In addition, the multi-location control apparatus distributes the image data of the former speaking location (PS) to the television conference terminal unit at the speaking location (NS).

FIG. 2 is a schematic diagram showing an example of the operation of the NS/PS designating mode. In this drawing, a multi-location control apparatus 20 is connected to television conference terminal units 12A, 12B, 12C, 12D, and 12E disposed at five locations of conference rooms A, B, C, D, and E, respectively through a network.

In this television conference system, when an attendant speaks at the conference room A or an image switching and selecting operation for an image of the conference room A is performed at another conference room, the multi-location control apparatus 20 designates the conference room A to the NS mode and sends the image data of the conference room A to the television conference terminal units at other conference rooms B, C, D, and E (see a solid arrow of FIG. 2). In addition, the multi-location control apparatus 20 sends the image data of the conference room D that has been designated to the PS mode to the conference room A that has been designated to the NS mode (see a dotted arrow of FIG. 2).

FIG. 3 is a block diagram showing an overall construction of a multi-location television conference system having a multi-location control apparatus 110 that automatically designates the conference rooms A, B, ..., and E to the NS/PS mode depending on detecting a speaking attendant and switches and controls image data to be distributed to the television conference terminal units 120A, 120B, ..., and 120E.

As shown in FIG. 3, each of the television conference terminal units 120A to 120E comprises a plurality of microphones 121, a microphone mixer 122, a speaker 123, a sound control unit 124, a sound encoding and decoding unit (hereinafter referred to as sound CODEC) 125, a camera 126, a monitor 127, an image CODEC 128, and a multiplexing and demultiplexing unit (MUX/DMUX) 129. The microphones 121 are directed to attendants in a conference room. The microphone mixer 122 mixes outputs of the microphones 121. The speaker 123 outputs a sound of another television conference terminal unit 120. The sound control unit 124 performs an input/output sound switching operation, an echo removing operation, or the like so as to prevent the output sound of the speaker 123 from entering the microphones 121. The sound CODEC 125 encodes sound data received from the sound control unit 123 and decodes sound data sent to the sound control unit 123. The camera 126 photographs the entire scene of the conference room, attendants, and/or materials. The monitor 127 displays images of other conference rooms received from other television conference terminal units 120. The image CODEC 128 encodes image data photographed by the camera 126 and decodes encoded data to an image to be displayed on the monitor 127. The MUX/DMUX unit 129 multiplexes and demultiplexes an input signal and an output signal of the sound CODEC 125 and the image CODEC 128.

The television conference terminal units 120A to 120E with the above-mentioned construction are connected to the multi-location control apparatus 110.

The multi-location control apparatus 110 comprises a multiplexing and demultiplexing (MUX/DMUX) unit 111, a sound CODEC 112, a sound level comparator 113, a mixer 114, an image selecting unit 115, and a control unit 116. The MUX/DMUX unit 111 multiplexes and demultiplexes sound data and image data received from and sent to each of the television conference terminal units 120A to 120E. The sound CODEC 112 is connected to the MUX/DMUX unit 111. The sound level comparator 113 compares levels of sound signals received from the sound CODECs 112 of the television conference terminal units 120A to 120E. The mixer 114 mixes the sound signals compared by the comparator 113 and sends the mixed sound signal to the speaker 123 of each of the television conference terminal units 120A to 120E through the sound CODEC 112 and the MUX/DMUX unit 111. The image selecting unit 140 selects image data demultiplexed by the MUX/DMUX unit 111 and sends the demultiplexed image data to the monitor 127 of each of the television conference terminal units 120A to 120E. The control unit 116 sends a selecting signal to the image selecting unit 140 corresponding to the compared result of the sound level comparator 113.

In this related art reference, the levels of the microphones 121 of the television conference terminal units 120A to 120E are compared by the sound level comparator 113 of the multi-location control apparatus 110. The multi-location control apparatus 110 designates the television conference terminal unit that outputs the maximum sound level to the NS mode. The image selecting unit 140 selects image data received from the television conference terminal unit with the maximum sound level and distributes this image data to other television conference terminal units.

FIG. 4 is a block diagram showing an inner construction of the image selecting unit 140.

Image data of the conference rooms A, B, C, . . . , and X at n locations are input to the input terminal 141. The image data are sent to an NS selecting unit 142 and a PS selecting unit 143 that select one from n alternatives. The NS selecting unit 142 and the PS selecting unit 143 receive a selecting signal from the control unit 116 and send image data of conference rooms that have been designated the n NS/PS selecting units 144A, 144B, 144C, . . . , and 144X to the NS and PS modes.

The output terminals of the NS/PS selecting units 144A, 144B, 144C, . . . , and 144X are connected to respective image data output terminals 145 of the conference rooms A, B, C, . . . , and X so as to select and output image data of the conference rooms that have been designated to the NS mode or PS mode.

In the image selecting unit 140 with the above-mentioned construction, when the conference room A is designated to the NS mode and the conference room E is designated to the PS mode, the control unit 116 outputs a selecting signal of the image data of the conference room A to the NS selecting unit 142 and a selecting signal of the image data of the conference room E to the PS selecting unit 143. The NS selecting unit 142 and the PS selecting unit 143 select and output image data received from the conference rooms A and B to the NS/PS selecting units 144A, 144B, . . . , and 144X. The NS/PS selecting unit 144A selects and outputs the image data of the conference room E, which has been designated the PS mode. The other NS/PS selecting units 144B, 144C, . . . , and 144X receive image data of the conference room A, which has been designated to the NS mode, from the control unit 116 and selects and outputs the image data. Thus, the image of the conference room A, which has been designated to the NS mode, is displayed on the respective monitors at the conference rooms B, C, . . . , and X, which have not been designated to the NS mode. On the other hand, the image of the conference room E, which has been designated to the PS mode, is displayed on the monitor at the conference room A, which has been designated to the NS mode.

In the first related art reference, image data is displayed in a fixed display format regardless of the number of speaking locations. In other words, the number of images of speaking locations displayed on a monitor at each conference room does not vary. Thus, when the system displays an image of one location, even if there are a plurality of speaking locations, only an image of a main speaking location is displayed. On the other hand, when the system displays a plurality of locations at a time, even if there is one speaking location, divided screen images of listening locations are also displayed on the monitor.

Thus, a listening attendant of a conference needs a certain amount of time to knows who is speaking. In this situation, the reality of the conference is deteriorated.

A first object of the present invention is to provide a display system that allows each attendant of a television conference to easily know speaking locations with reality.

In the related art multi-location television conference system having the conventional NS/PS designating mode, when in conference rooms that have not been designated to the NS mode, a conference room is selected, since this selected conference room is designated to the NS mode, monitor images of other conference rooms are switched. On the other hand, in the system that automatically designates the NS mode when detecting a speaking attendant, whenever a speaking location (conference room) is changed, the monitor image data is automatically switched regardless of the intention of listening attendants. Thus, these attendants cannot continue to see images of other conference rooms other than those of speaking locations.

Thus, in the conventional multi-location control apparatus with the designating of NS/PS modes, attendants of other conference rooms cannot select images of conference rooms they want to see. When an attendant of another conference room changes the mode or speaks, the image thereof is automatically displayed on the monitor screens of other conference rooms. This automatic switching of images of conference rooms adversely affects the proceeding of the conference.

A second object of the present invention is to hold a television conference at multiple locations with reality similar to a real convention.

Since any related art references of multi-location television conference systems display only image data of a conference room, attendants of the conference cannot easily know who is speaking at what conference room. Thus, the conference cannot be smoothly progressed.

A third object of the present invention is to allow each attendant to easily know background information (such as conference room name, location name, name and title of speaking attendant, and the like) with respect to image data of a conference room displayed on the monitor screen.

SUMMARY OF THE INVENTION

A first aspect of the present invention is a multi-location control apparatus for use with a multi-location television conference system that has a plurality of multi-location television conference terminal units disposed at three or more locations, each of said television conference terminal units being adapted for transmitting and receiving sound data and image data, said multi-location control apparatus being adapted for receiving sound data and image data from all of said television conference terminal units and for transmitting sound data and image data to said television conference terminal units, said multi-location control apparatus comprising a speaking location detecting unit for detecting a speaking location corresponding to sound signals that are output from sound input unit of each of said television conference terminal units, an image combining unit for generating image data containing images of speaking locations when a plurality of speaking locations are detected by said speaking location detecting unit and an image distributing unit for transmitting image data generated by said image combining unit to each of said television conference terminal units.

A second aspect of the present invention is a multi-location control apparatus for use with a multi-location television conference system that has a plurality of multi-location television conference terminal units disposed at three or more locations, each of said television conference terminal units being adapted for transmitting and receiving sound data and image data, said multi-location control apparatus being adapted for switching and controlling sound data and image data transmitted among all of said television conference terminal units, said multi-location control apparatus comprising a switching and outputting unit for inputting image data of said conference rooms from all of said television conference terminal units and for switching and outputting image data of any conference room to each of said television conference terminal units independent from other television conference terminal units and a control unit for controlling said switching and outputting unit so that when a switching request for displaying an image of a desired conference room is issued from a particular television conference terminal unit, image data to be transmitted to this particular television conference terminal unit is switched to the desired image data by the particular television conference terminal unit.

A third aspect of the present invention is a multi-location control apparatus for use with a multi-location television conference system that has a plurality of multi-location television conference terminal units disposed at three or more locations, each of said television conference terminal units being adapted for transmitting and receiving sound data and image data, said multi-location control apparatus being adapted for switching and controlling sound data and image data transmitted among all of said television conference terminal units, said multi-location control apparatus comprising a mode designating unit having a first mode and a second mode, said first mode being adapted for selecting image data of a conference room displayed at a television conference terminal unit independent from other television conference terminal units, said second mode being adapted for forcedly selecting image data of a conference room displayed at a television conference terminal unit corresponding to an occurrence of a predetermined event of another television conference terminal unit, a mode designating unit for designating either said first mode or said second mode to each of said conference rooms corresponding to a mode designating request received from a television conference terminal unit of each of said conference rooms, a switching and outputting unit for inputting image data of said conference rooms from all of said television conference terminal units and for switching and outputting image data of any conference room to each of said television conference terminal units independent from other television conference terminal units, a first control unit for controlling said switching and outputting unit so that when a switching request for displaying an image of a desired conference room is issued from a particular television conference terminal unit that has been designated to said first mode, image data to be transmitted to this particular television conference terminal unit is switched to the desired image data by the particular television conference terminal unit, and a second control unit for controlling said switching and outputting unit so that when said event takes place in a particular television conference terminal unit, image data to be transmitted to television conference terminal units that have been designated to said second mode are switched to image data of the television conference terminal unit.

A fourth aspect of the present invention is a multi-location control apparatus for use with a multi-location television conference system that has a plurality of multi-location television conference terminal units disposed at three or more locations, each of said television conference terminal units being adapted for transmitting and receiving sound data and image data, said multi-location control apparatus being adapted for switching and controlling sound data and image data transmitted among all of said television conference terminal units, said multi-location control apparatus comprising a code generating unit for generating a background information code corresponding to a background information number according to an image of a conference room that has been encoded and received from a television conference terminal unit of the conference room that has been switched and selected, and a multiplexing and distributing unit for multiplexing the encoded data of the image signal of the conference room received from the television conference terminal unit of the conference room that has been switched and selected and the code generated by said code generating unit and for distributing the multiplexed signal to all of the television conference terminal units.

A fifth aspect of the present invention is a multi-location control apparatus for use with a multi-location television conference system that has a plurality of multi-location television conference terminal units disposed at three or more locations, each of said television conference terminal units being adapted for transmitting and receiving sound data and image data, said multi-location control apparatus being adapted for switching and controlling sound data and image data transmitted among all of said television conference terminal units, said multi-location control apparatus comprising an image generating unit for generating a background information code corresponding to a background information number according to an image of a conference room that has been encoded and received from a television conference terminal unit of the conference room that has been switched and selected, an image decoding unit for decoding the encoded data of the image signal of the conference room received from the television conference terminal unit of the conference room that has been switched and selected to an image signal, an image superimposing unit for superimposing the image signal generated by said image generating unit over the image signal decoded by said image decoding unit and, an encoding unit for encoding the image signal generated by said image superimposing unit.

BRIEF DESCRIPTION OF THE DRAWINGS

One skilled in the art can easily understand additional features and objects of this invention from the description of the preferred embodiments and some of the attached drawings. In the drawings:

FIGS. 15A–15B are schematic diagrams for explaining display method in the case that speeches take place at four locations at the same time;

FIGS. 16A–16B are schematic diagrams for explaining display method in the case that speeches take place at two locations at the same time;

FIGS. 17A–17B are schematic diagrams for explaining display method in the case that a speech takes place at one location;

FIG. 26 is a schematic diagram showing inner construction of a mode management table;

FIG. 27 is a schematic diagram showing inner construction of an NS/PS management table;

FIG. 28 is a schematic diagram showing inner construction of a displaying conference room management table;

FIG. 29 is a schematic diagram showing inner construction of a matrix switcher status table;

FIGS. 31A–31C are schematic diagrams for explaining table rewrite operation corresponding to a detection of a speaking attendant;

FIGS. 33A–33B are schematic diagrams for explaining table rewrite operation corresponding to a displaying conference room switching operation (No. 1);

FIGS. 34A–34C are schematic diagrams for explaining table rewrite operation corresponding to a displaying conference room switching operation (No. 2);

FIGS. 35A–35C are schematic diagrams for explaining table rewrite operation corresponding to a displaying conference room switching operation (No. 3);

FIGS. 37A–37D are schematic diagrams for explaining table rewrite operation corresponding to designated mode changing operation (No. 1);

FIG. 38 is a schematic diagram for explaining table rewrite operation corresponding to designated mode changing operation (No. 2);

FIG. 42 is a schematic diagram showing overall construction of a multi-location television conference system according to a third embodiment of the present invention;

FIG. 43 is a schematic diagram showing an example of a screen display according to the third embodiment;

DESCRIPTION OF THE PREFERRED EMBODIMENTS

Figure 1:
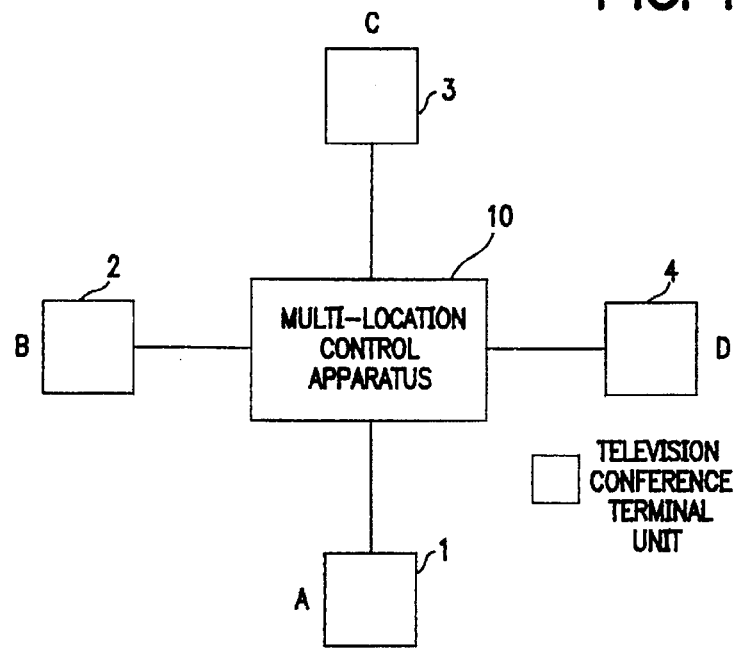
FIG. 1 is a schematic diagram showing overall construction of a multi-location television conference system.
Figure 2:
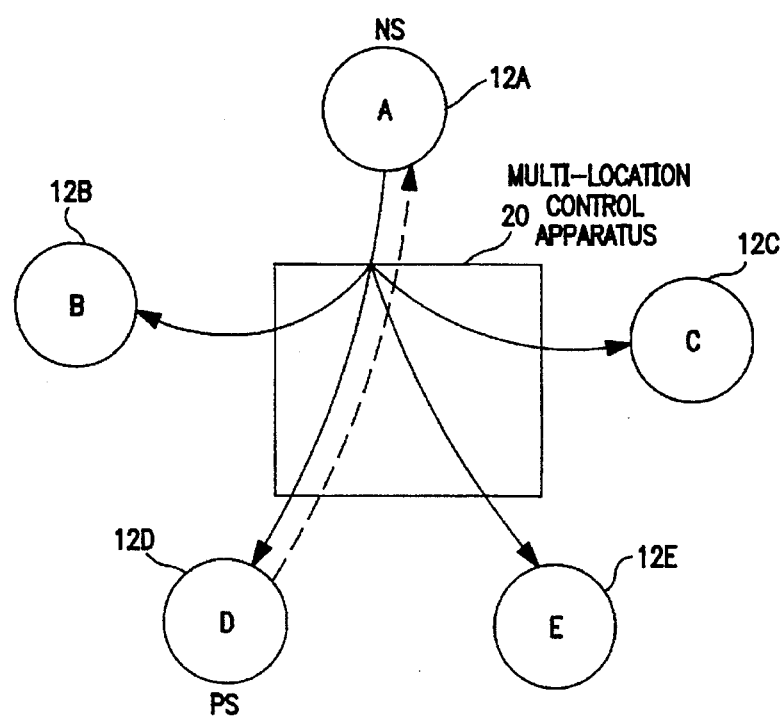
FIG. 2 is a schematic diagram for explaining the operation of an NS/PS designating mode.
Figure 3:
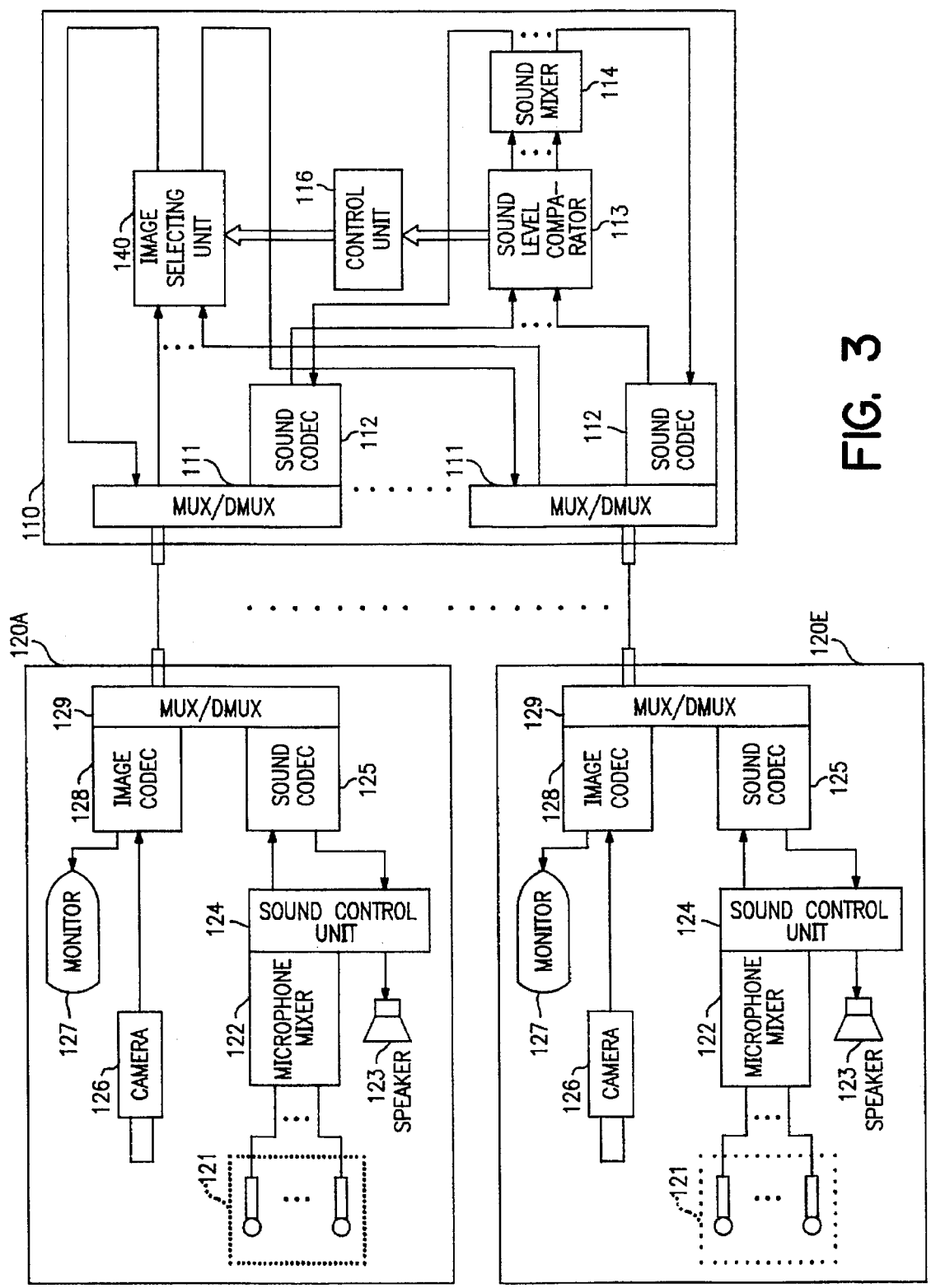
FIG. 3 is a block diagram showing a construction of a conventional multi-location television conference system.
Figure 4:
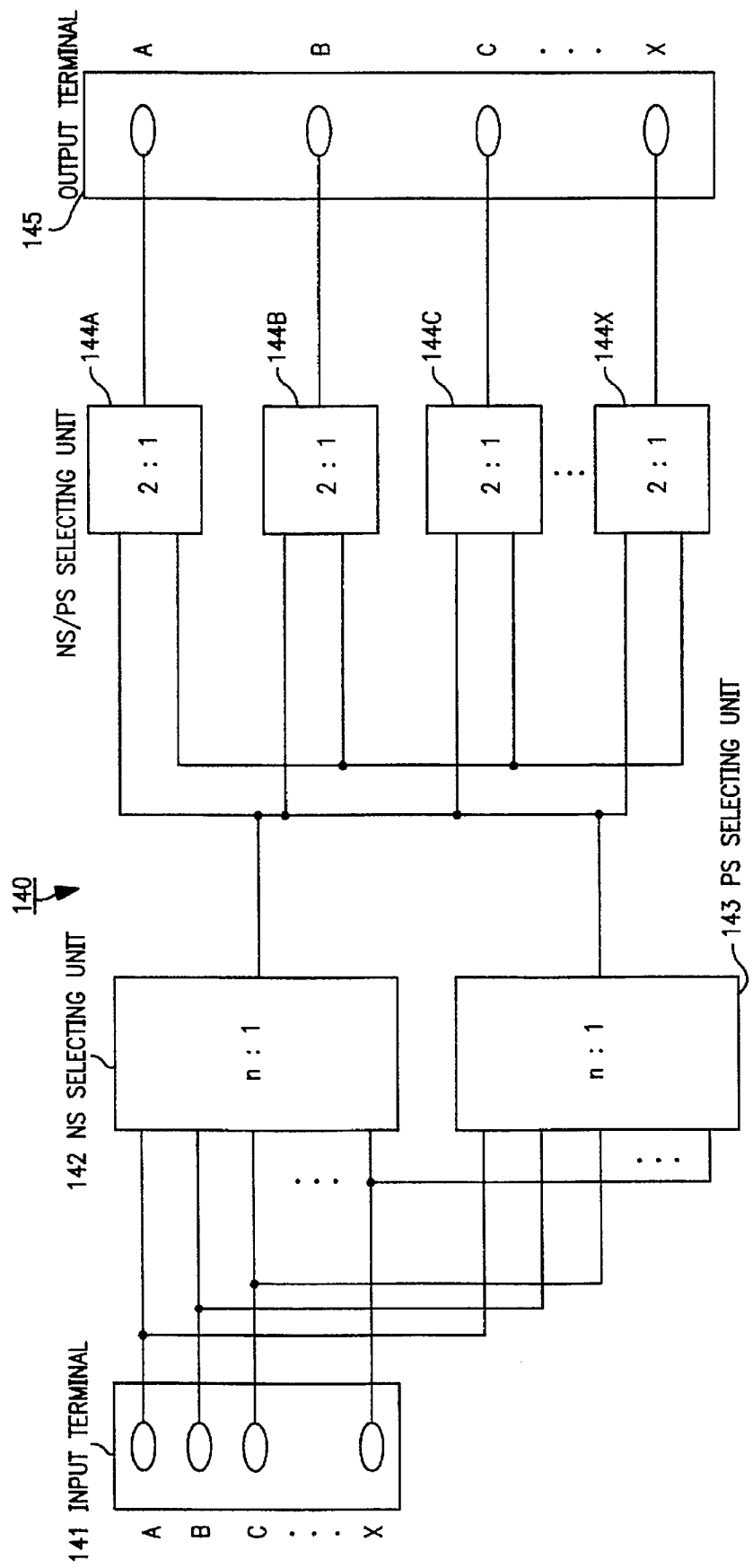
FIG. 4 is a block diagram showing an inner construction of a multi-location control apparatus having a conventional NS/PS designating mode.
Figure 5:
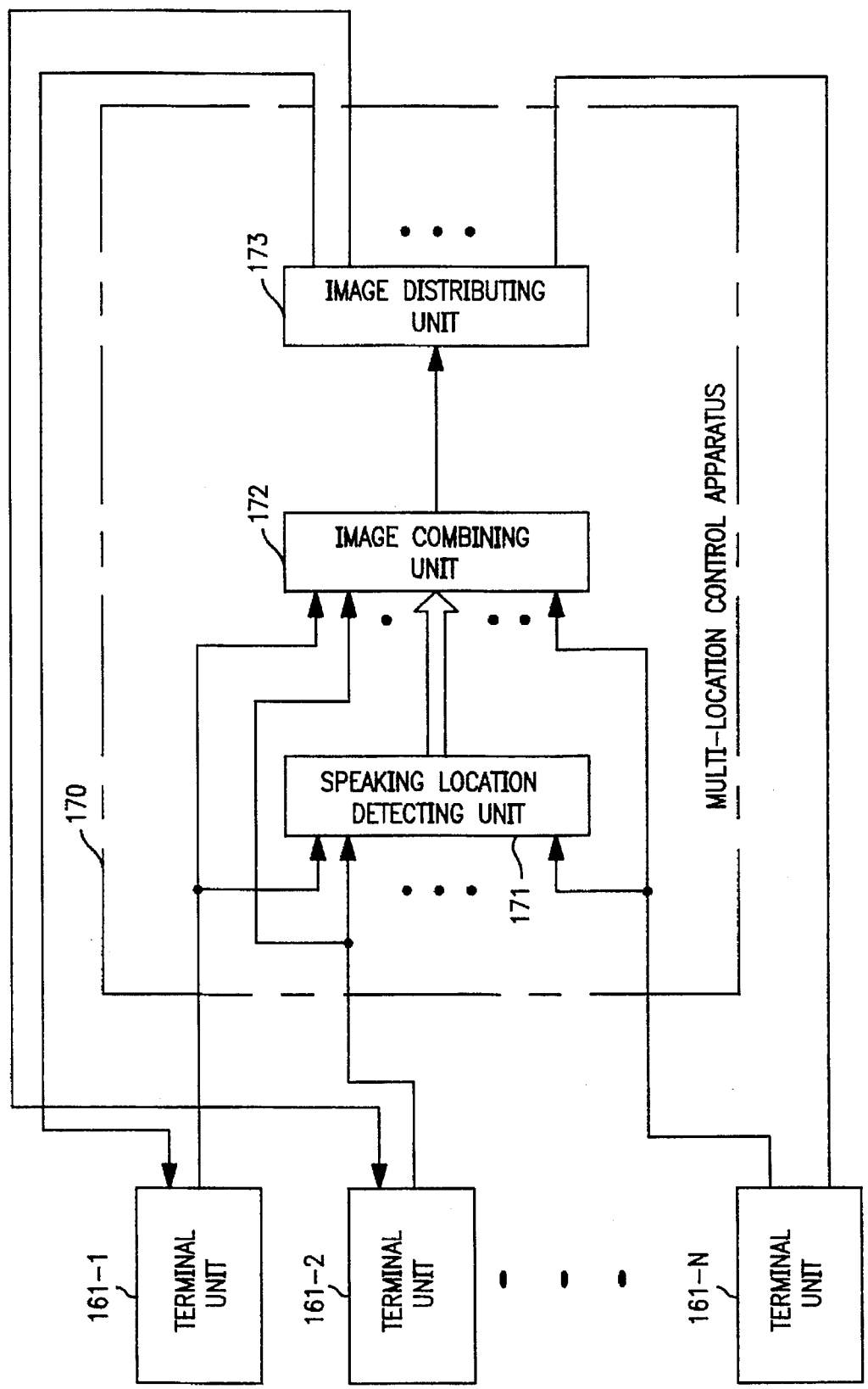
FIG. 5 is a block diagram showing a principle of construction of the present invention (No. 1)

FIG. 5 is a block diagram showing a principle of construction according to a first aspect of the present invention.

In this drawing, reference numerals 161-1, 161-2, 161-3 and 161-N are television conference terminal units that receive and transmit sound data and image data. The first aspect of the present invention is a multi-location control apparatus for use with a multi-location television conference system that has a plurality of multi-location television conference terminal units 161-i (where i=1, 2, . . . , N) disposed at three or more locations, each of the television conference terminal units being adapted for transmitting and receiving sound data and image data, the multi-location control apparatus being adapted for receiving sound data and image data from all of the television conference terminal units 161-i and for transmitting sound data and image data to the television conference terminal units 161-i.

The multi-location control apparatus 170 comprises speaking location detecting unit 171 for detecting a speaking location corresponding to sound signals that are output from sound input units of each of the television conference terminal units 161-i, image combining unit 172 for generating image data containing images of speaking locations when a plurality of speaking locations are detected by the speaking location detecting unit 171, and image distributing unit 173 for transmitting image data generated by the image combining unit 172 to each of the television conference terminal units 161-i.

In the multi-location control apparatus, the speaking location detecting unit 171 detects occurrences of speaking locations with sound input signals received from the television conference terminal units 161-1, 161-2, . . . , and 161-N. The image combining unit 172 divides and combines image signals of the speaking locations so as to generate an image signal that allows images of speaking locations to be displayed on divided screen areas of a monitor at a time. The image distributing unit 173 distributes the image signal to each of the television conference terminal units 161-i (where i=1, 2, . . . , and N). Thus, when there are a plurality of speaking locations, images of the speaking locations are displayed on monitor screen of each of the television conference terminal units 161-i. Corresponding to the number of speaking locations, the number of images of speaking locations displayed on each monitor varies.

The image combining unit 172 may be adapted for generating image data of speaking locations detected by the speaking location detecting unit 171 for listening locations where speeches are not detected by the speaking location detecting unit 171, the image data being contained in one screen, and the image distributing unit 173 may be adapted for distributing the image data to television conference terminal units 161-i of the listening locations.

In this case, for listening locations, the image combining unit 172 generates image data that contains only images of speaking locations in one screen. The image distributing unit 173 distributes the image data to terminal units 161-i at listening locations.

Thus, when there are a plurality of speaking locations, images of the speaking locations are simultaneously displayed at terminal units 161-i at listening locations.

In addition, the image combining unit 172 may be adapted for generating image data of other speaking locations and a former speaking location for each of the speaking locations, the image data being contained in one screen, and the image distributing unit 173 may be adapted for transmitting the image data to television conference terminal units 161-i of the speaking locations.

In this case, for speaking locations, the image combining unit 172 generates image data that contains images of other speaking locations and an image of a former speaking location in one screen. The image distributing unit 173 distributes the image data to each of the speaking locations.

Thus, each of the television conference terminal units 161-i at the speaking locations displays images of other speaking locations and an image of the former speaking location at a time.

Figure 6:
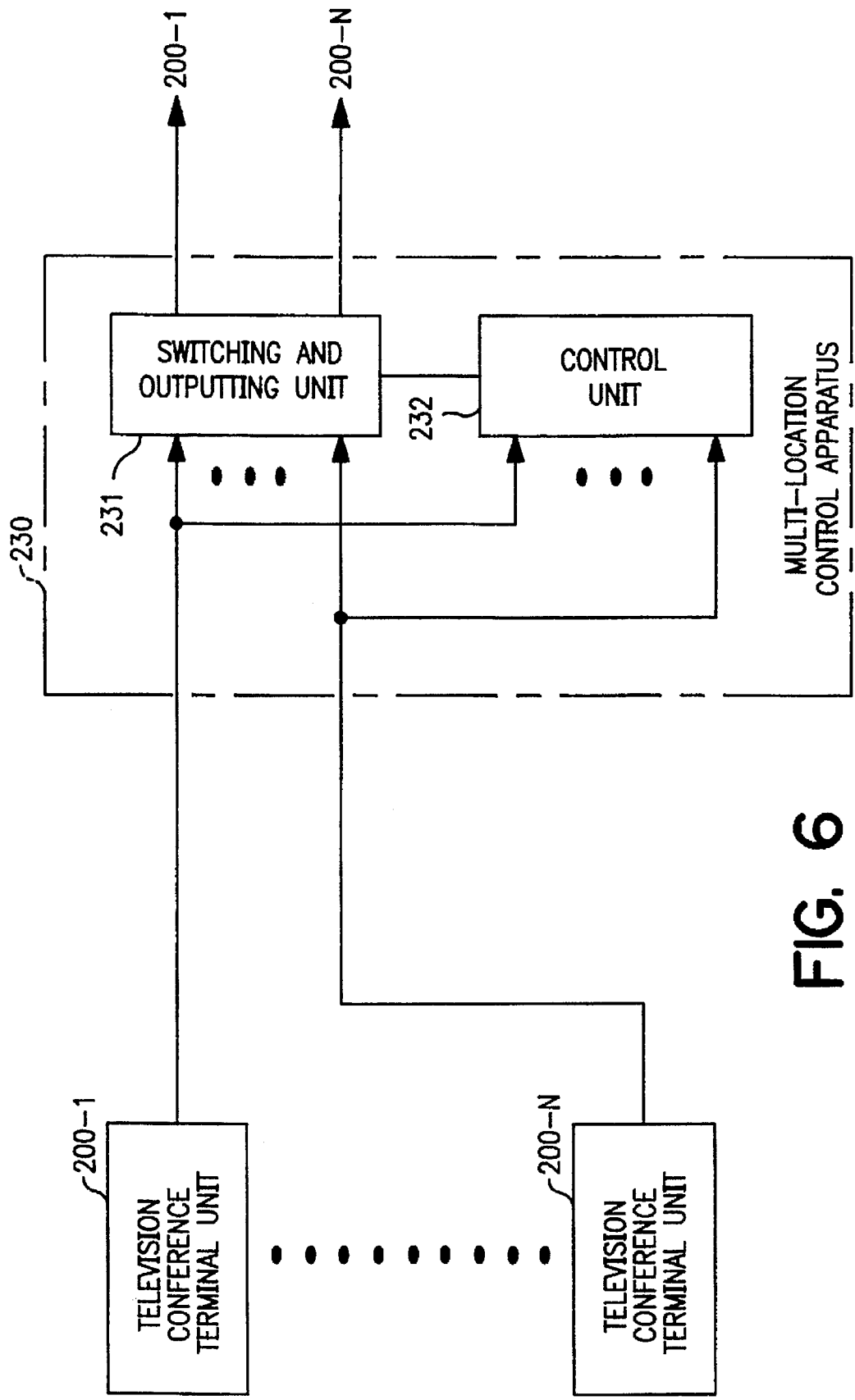
FIG. 6 is a block diagram showing a principle of construction of the present invention (No. 2)

FIG. 6 is a block diagram showing the principle of construction according to a second aspect of the present invention.

The second aspect of the present invention is a multi-location control apparatus 230 for use with a multi-location television conference system that has a plurality of multi-location television conference terminal units 200-i (where i=1, 2, . . . , and N) disposed at three or more locations, each of the television conference terminal units being adapted for transmitting and receiving sound data and image data, the multi-location control apparatus being adapted for switching and controlling sound data and image data transmitted among all of the television conference terminal units 200-i.

The multi-location control apparatus comprises switching and outputting unit 231 for inputting image data of the conference rooms from all of the television conference terminal units 200-1, 200-2, . . . , 200-N and for switching and outputting image data of any conference room to each of the television conference terminal units 200-i independent from other television conference terminal units 200-j (where j≠i, j=1, 2, . . . , and N), and control unit 232 for controlling the switching and outputting unit 231 so that when a switching request for displaying an image of a desired conference room is issued from a particular television conference terminal unit 200-i, image data to be transmitted to this particular television conference terminal unit 200-i is switched to the desired image data by the particular television conference terminal unit 200-i.

According to the second aspect of the present invention, when a television conference terminal unit 200-i (where i=1, 2, . . . , and N) issues an image switching request to the control unit 232, the control unit 232 controls the switching and outputting unit 231 so that only image data to be transmitted to the terminal 200-i is switched to image data of a conference room designated by this request.

Thus, when the television conference terminal unit 200-i of each conference room is operated so as to issue an image switching request for a desired conference room, only the image of the conference room that issues the request is switched to the image of the desired conference room. At this point, images displayed at other conference rooms are not switched.

Figure 7:
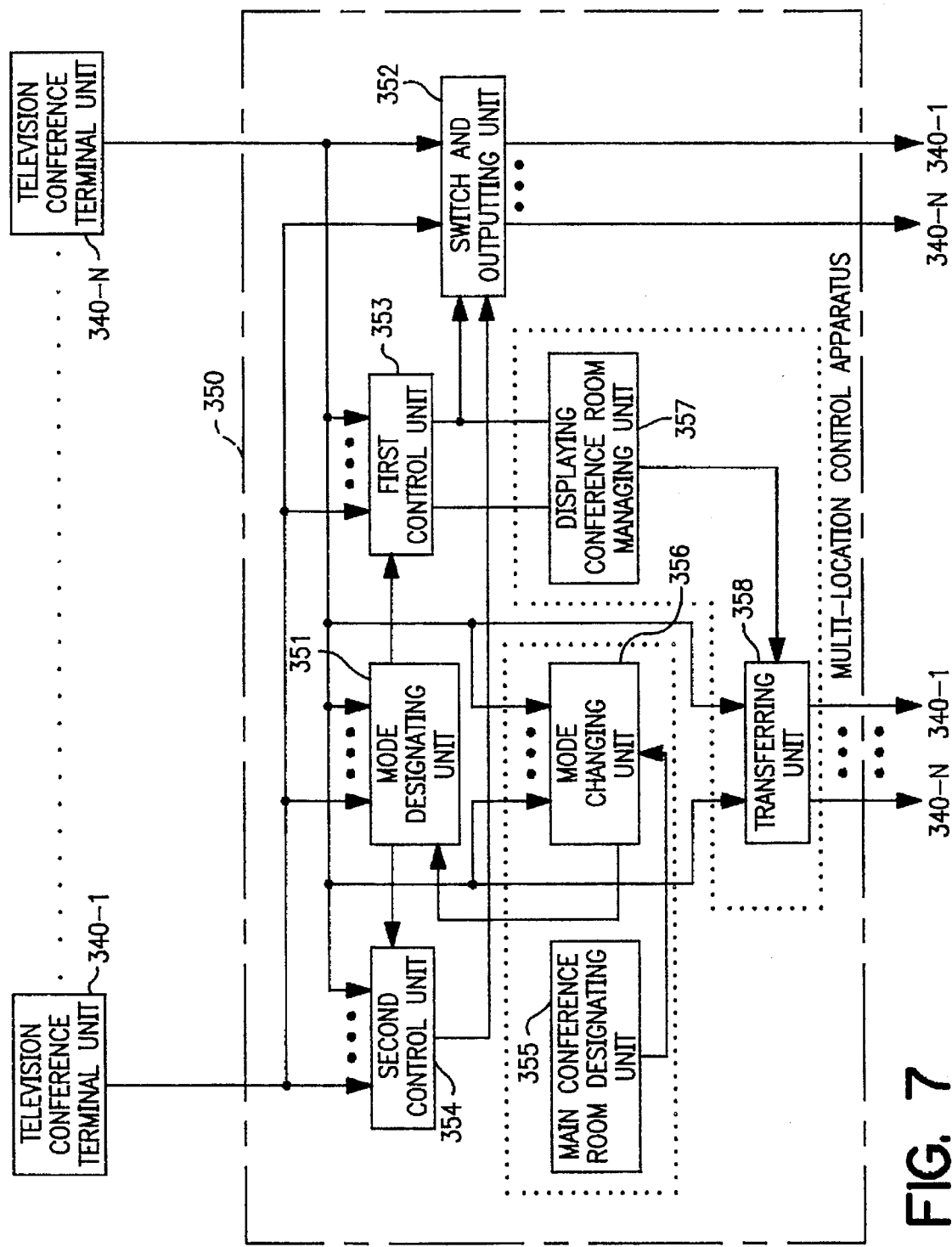
FIG. 7 is a block diagram showing a principle of construction of the present invention (No. 3)

FIG. 7 is a block diagram showing a principle of construction according to a third aspect of the present invention. The third aspect of the present invention is a multi-location control apparatus for use with a multi-location television conference system that has a plurality of multi-location television conference terminal units 340-i (where i=1, 2, . . . , and N) disposed at three or more locations, each of the television conference terminal units being adapted for transmitting and receiving sound data and image data, the multi-location control apparatus being adapted for switching and controlling sound data and image data transmitted among all of the television conference terminal units 340-i, the multi-location control apparatus comprising a mode designating unit having a first mode and a second mode, the first mode being adapted for selecting image data of a conference room displayed at a television conference terminal unit 340-i independent from other television conference terminal units 340-j (where j≠i, j=1, 2, . . . , N), the second mode being adapted for forcedly selecting image data of a conference room displayed at a television conference terminal unit 340-j corresponding to an occurrence of a predetermined event of another television conference terminal unit 340-i, a mode designating unit 351 for designating either the first mode or the second mode to each of the conference rooms corresponding to a mode designating request received from a television conference terminal unit 340-i of each of the conference rooms, a switching and outputting unit 352 for inputting image data of the conference rooms from all of the television conference terminal units 340-1, 340-2, . . . , and 340-N and for switching and outputting image data of any conference room to each of the television conference terminal units 340-i independent from other television conference terminal units 340-j (where j≠i, j=1, 2, . . . , N), a first control unit 353 for controlling the switching and outputting unit 352 so that when a switching request for displaying an image of a desired conference room is issued from a particular television conference terminal unit 340-i that has been designated to the first mode, image data to be transmitted to this particular television conference terminal unit 340-i is switched to the desired image data by the particular television conference terminal unit 340-i, and a second control unit 354 for controlling the switching and outputting unit 352 so that when the event takes place in a particular television conference terminal unit 340-i, image data to be transmitted to television conference terminal units 340-k (where k=1, 2, . . . , N) that have been designated to the second mode are switched to image data of the television conference terminal unit 340-i.

The predetermined event is a detection of a speaking conference room, an image switching request operation performed by a television conference terminal unit 340-i at a conference room, or the like.

The operation of the third aspect of the present invention is as follows.

When a mode designating operation is performed with a television conference terminal unit 340-i at a particular conference room, the mode designating unit 351 designates the conference room to the designated mode.

When an image switching request for a desired conference room is issued with a television conference terminal unit 340-i at a conference room that has been designated to the first mode, the first control unit 353 controls the switching and outputting unit 352 so that only image data to be sent to the television conference terminal unit 340-i of the conference room that has issued the switching request is switched to image data of the requested conference room.

When a particular event (such as speech or image switching operation) takes place in a television conference terminal unit 340-i at a particular conference room, the second control unit 354 controls the switching and outputting unit 352 so that only image data of conference rooms that have been designated to the second mode is switched to image data of a conference room corresponding to the event.

Thus, when a television conference terminal unit 340-i is operated at a conference room that has been designated to the first mode, an image of a desired conference room can be selected independently of the other conference rooms. In addition, the image of the desired conference room is not switched even if a speaking location takes place or an image switching operation is performed at another conference room.

In this construction, the mode designating unit 351 may be adapted for designating an automatic switching enable mode to a conference room when receiving an automatic switching request from a television conference terminal unit 340-i of the conference room that has been designated to the second mode, the second control unit may be adapted for controlling the switching and outputting unit 352 so that when a speech is detected by a television conference terminal unit 340-i at a particular conference room, image data to be transmitted to television conference terminal units 340-k (where k=1, 2, . . . , N) of conference rooms that have been designated to the second mode and the automatic switching enable mode are switched to image data received from the television conference terminal unit 340-i.

In this case, when an automatic switching enable designating operation is performed at a television conference terminal unit 340-i at a conference room that has been designated to the second mode, the mode designating unit 351 designates this conference room to this mode.

When a speech is detected at a conference room in the case that image data is sent to terminal units 340-i of conference rooms that have been designated to the first mode or the second mode and that have been designated to the automatic switching mode, the second control unit 354 controls the switching and outputting unit 352 in the same manner as the case that such an event is detected. However, the second control unit 354 controls the switching and outputting unit 352 so that image data of conference rooms where speeches are detected is sent to terminal units 340-j at conference rooms that have been designated to the second mode, but not the automatic switching enable mode.

Thus, in a television conference terminal unit 340-i at a conference room that has been designated to the second mode and the automatic switching enable mode, only when a speech is detected, an image of this speaking location is automatically displayed.

FIG. 7 also shows principle construction of the fourth and sixth aspects of the present invention.

The fourth aspect of the present invention is the multi-location television conference system having units 351, 352, 353, and 354, further comprising a main conference room designating unit 355 for selecting and designating a main conference room from all of the conference rooms and a mode changing unit for forcedly changing modes of all of the conference rooms managed by the mode designating unit 351 to either the first mode or the second mode designated by a television conference terminal unit 340-i at a particular conference room when the particular conference room is the main conference room.

According to the fourth aspect of the present invention, the main conference room designating unit 355 selects and designates a main conference room from all the conference rooms in the system.

When a forced mode change request to the first mode or the second mode is issued by an operation of a television conference terminal unit 340-i at a particular conference room, the mode changing unit 356 accepts this request only when this conference room has been designated to a main conference room. After accepting this request, the mode changing unit 356 forcedly changes the present modes of all other conference rooms to a designated mode.

Thus, at the conference room that has been designated as the main conference room, the modes of all other conference rooms in the system can be forcedly changed to a desired mode by the television conference terminal unit 340-i.

The fifth aspect of the present invention is the multi-location control apparatus of the third aspect having units 351, 352, 353, and 354 or of the fourth aspect having units 351, 352, 353, 354, 355, and 356, further comprising a displaying conference room managing unit 357 for receiving switching information from the first and second control units 353 and 354 so as to store conference rooms displayed on television conference terminal units 340-i at the conference rooms 340-i, and a transferring unit 358 for seeking a conference room whose image is being displayed on a television conference terminal unit 340-i at a particular conference room with reference to information stored in the displaying conference room managing unit 357 and for transferring the camera control information to the television conference terminal unit 340-j when receiving camera control information from the television conference terminal unit 340-i at the particular conference room.

In this case, the displaying conference room managing unit 357 receives switching information of the switching and outputting unit 352 from the first and second control units 353 and 354 and stores data of conference rooms currently displayed at each conference room.

Thus, when remote location camera control information is sent from a conference room by an operation of a television conference terminal unit 340-i, the transferring unit 358 references the displaying conference room managing unit 357 and transfers the remote location camera control information to the television conference terminal unit 340-j at this conference room.

Thus, cameras of conference rooms whose images are displayed can be remotely controlled from television conference terminal units 340-i at all other conference rooms.

Figure 8:
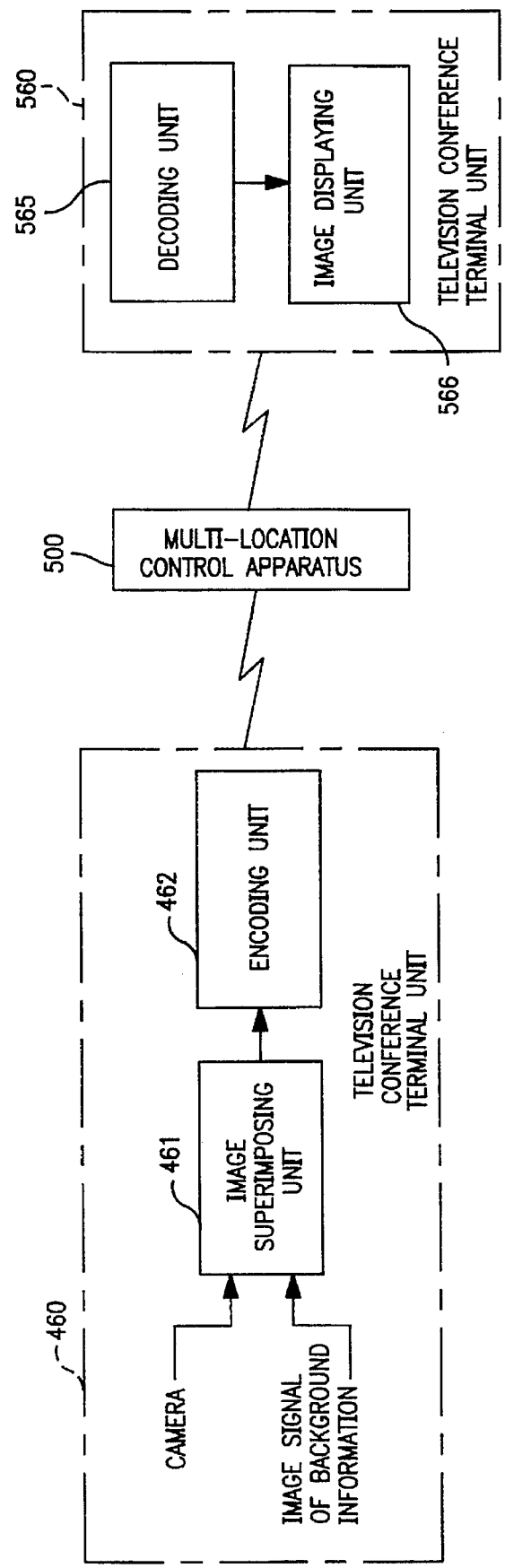
FIG. 8 is a block diagram showing a principle of construction of the present invention (No. 4)

FIG. 8 is a block diagram showing a principle of construction of sixth and seventh aspects.

The sixth aspect of the invention is a television conference terminal apparatus 460, comprising an image superimposing unit 461 for generating an image signal where an image of background information is superimposed over an image of a conference room photographed by a camera, and an encoding unit 462 for encoding an image signal generated by the image superimposing unit 461.

The seventh aspect of the present invention is a television conference terminal unit 560, a comprising decoding unit 565 for decoding data encoded by the encoding unit 462 of the television conference terminal unit 460 of the sixth aspect and an image displaying unit 566 for displaying an image corresponding to an image signal decoded by the decoding unit 565.

In the television conference terminal unit 460, the image superimposing unit 461 superimposes an image signal of background information (such as a location name, a conference room name, a title of a speaking attendant, and so forth) over an image signal of a conference room photographed by a camera. The superimposed signal is encoded by the encoding unit 462. The encoded data is sent to the multi-location control apparatus 500.

On the other hand, when the television conference terminal unit 560 receives encoded data from the multi-location control apparatus 500, the decoding unit 565 decodes the encoded data to an image signal. The image displaying unit 566 displays the image signal as an image.

Thus, when the multi-location television conference system is constructed of the television conference terminal units 460 and 560, an image of each conference room and background information (location name and the like) thereof can be displayed at a given time.

Figure 9:
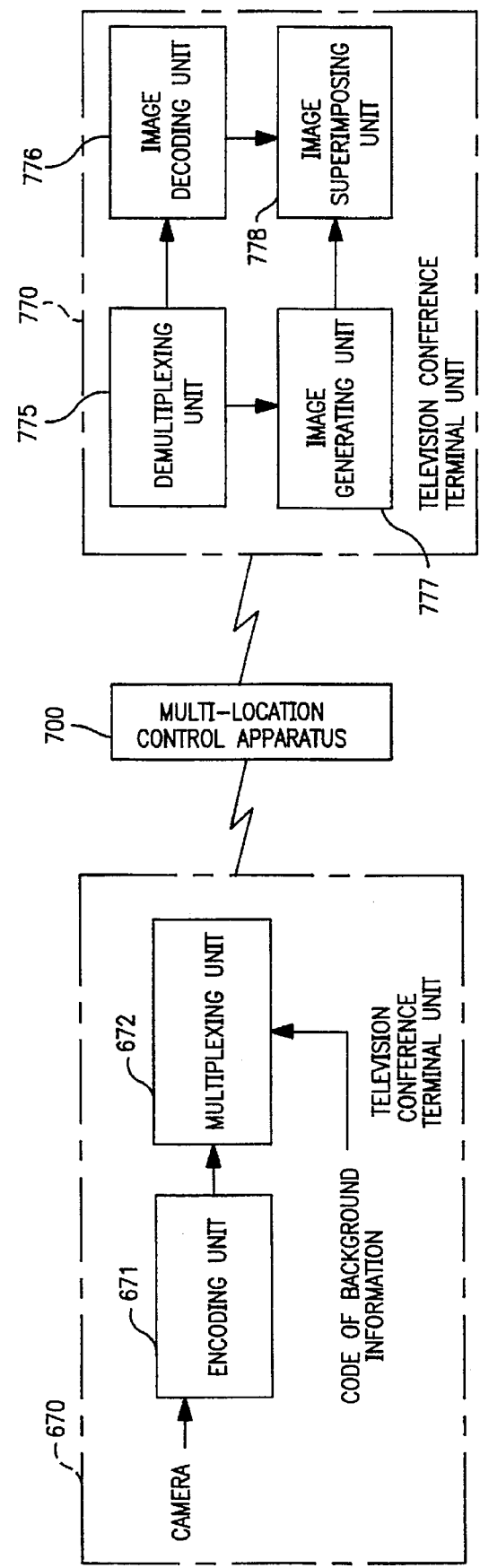
FIG. 9 is a block diagram showing a principle of construction of the present invention (No. 5)

FIG. 9 is a block diagram showing a principle of construction of eighth and ninth aspects of the present invention.

The eighth aspect of the present invention is a television conference terminal unit 670, comprising a encoding unit 671 for encoding an image signal of a conference room photographed by a camera and a multiplexing unit 672 for multiplexing data encoded by the encoding unit 671 and background information code of the image of the conference room photographed by the camera.

The ninth aspect of the present invention is a television conference terminal unit 770, comprising a demultiplexing unit 775 for demultiplexing the multiplexed data generated by the multiplexing unit 672 of the television conference terminal unit 670 into the encoded data of the image signal of the conference room and the background information code, an image decoding unit 776 for decoding the encoded data of the image signal of the conference room demultiplexed by the demultiplexing unit 775 to an image signal, an image generating unit 777 for generating an image signal corresponding to the background information code demultiplexed by the demultiplexing unit 776, and an image superimposing unit 778 for superimposing the image signal generated by the image generating unit 777 over the image signal decoded by the image decoding unit 776.

In the television conference terminal unit 670, the encoding unit 671 encodes an image signal of a conference room that has been photographed by a camera. The multiplexing unit 672 multiplexes the encoded data with a code of background information thereof. The multiplexed data is sent to the television conference terminal units 770 of the present invention through the multi-location control apparatus 700.

When the television conference terminal unit 770 receives the multiplexed data, the demultiplexing unit 775 demultiplexes the multiplexed data into a code of background information of a conference room and encoded data of an image signal thereof. The image decoding unit 776 decodes the encoded data to an image signal of a conference room. The image generating unit 777 generates an image signal corresponding to the code. The image superimposing unit 778 superimposes the image signal of the code over the image signal of the conference room. The superimposed image is displayed on a display unit.

Thus, when the multi-location television conference system is constructed of the above-mentioned two television conference terminal units 670 and 770, an image of a conference room and background information thereof can be displayed as a superimposed image at each of conference rooms.

Figure 10:
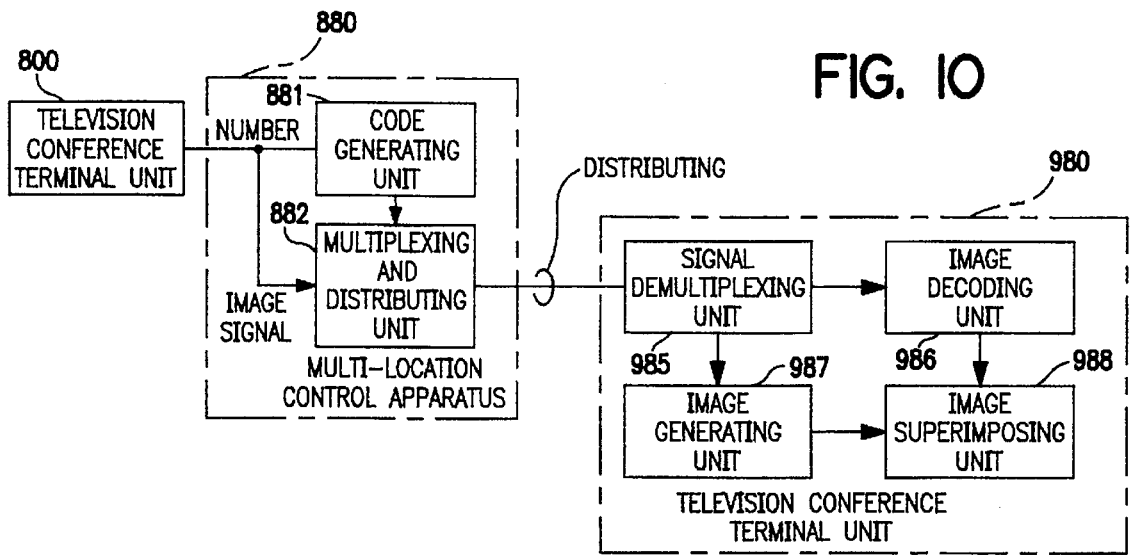
FIG. 10 is a block diagram showing a principle of construction of the present invention (No. 6)

FIG. 10 is a block diagram showing a principle of construction of tenth and eleventh aspects of the present invention.

The tenth aspect of the present invention is a multi-location control apparatus 880 for use with a multi-location television conference system that has a plurality of multi-location television conference terminal units disposed at three or more locations, each of the television conference terminal units being adapted for transmitting and receiving sound data and image data, the multi-location control apparatus 880 being adapted for switching and controlling sound data and image data transmitted among all of the television conference terminal units, the multi-location control apparatus comprising a code generating unit 881 for generating a background information code corresponding to a background information number according to an image of a conference room that has been encoded and received from a television conference terminal unit of the conference room that has been switched and selected, and a multiplexing and distributing unit 882 for multiplexing the encoded data of the image signal of the conference room received from the television conference terminal unit of the conference room that has been switched and selected and the code generated by the code generating unit 881 and for distributing the multiplexed signal to all of the television conference terminal units.

The code generating unit 881 references a database that stores conference room numbers and corresponding background information (for example, location names) in a manner of one-to-one correspondence so as to convert a conference room number to the corresponding background information.

The eleventh aspect of the present invention is a television conference terminal unit 980, comprising a signal demultiplexing unit 985 for demultiplexing the multiplexed signal received from the multi-location control apparatus 880 into the encoded data of the image signal of the conference room and the background information code of the image of the conference room, image decoding unit 986 for decoding the encoded data demultiplexed by the signal demultiplexing unit 985 into the image signal of the conference room, an image generating unit 987 for generating the image signal of the background information corresponding to the code demultiplexed by the signal demultiplexing unit 985, and an image superimposing unit 988 for superimposing the image signal generated by the background information image generating unit 987 over the image signal decoded by the image decoding unit 986.

In the multi-location control apparatus 880, the code generating unit 881 generates a code of background information corresponding to a background information number received from a television conference terminal unit 800. The multiplexing and distributing unit 882 multiplexes the code and the encoded data of the image signal and distributes the multiplexed signal to each of the television conference terminal units 980.

In the television conference terminal unit 980, the signal demultiplexing unit 985 demultiplexes the multiplexed signal received from the multi-location control apparatus into encoded data of an image of a conference room that has been switched and selected and a code of background information thereof. The image decoding unit 986 decodes the encoded data. The image generating unit 987 generates an image signal of the background information corresponding to the code. The image superimposing unit 988 superimposes the image signal of the background information over the image signal of the conference room. The superimposed image is displayed on the display unit.

Thus, when the multi-location television conference system is constructed of the television conference terminal units 980 and the multi-location control apparatus 880, an image of a conference room and background information can be displayed as a superimposed image at each of conference rooms.

Figure 11:
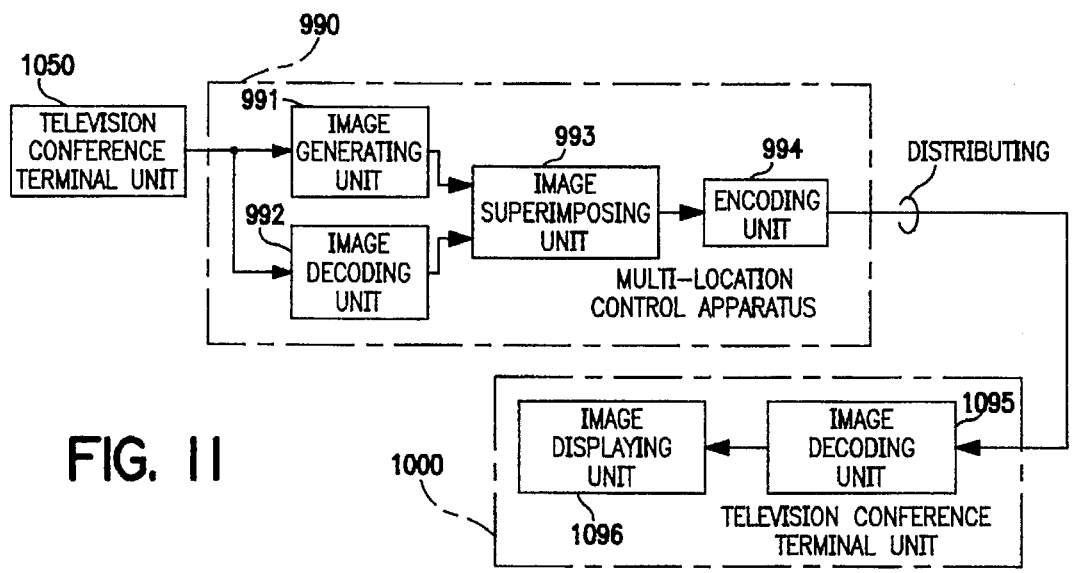
FIG. 11 is a block diagram showing a principle of construction of the present invention (No. 7)

FIG. 11 is a block diagram showing a principle of construction of twelfth and thirteenth aspects of the present invention.

The twelfth aspect of the present invention is a multi-location control apparatus for use with a multi-location television conference system that has a plurality of multi-location television conference terminal units disposed at three or more locations, each of the television conference terminal units being adapted for transmitting and receiving sound data and image data, the multi-location control apparatus being adapted for switching and controlling sound data and image data transmitted among all of the television conference terminal units.

The multi-location control apparatus 990 of the twelfth aspect comprises an image generating unit 991 for generating an image signal of a background information code corresponding to a background information number according to an image of a conference room that has been encoded and received from a television conference terminal unit of the conference room that has been switched and selected, an image decoding unit 992 for decoding the encoded data of the image signal of the conference room received from the television conference terminal unit of the conference room that has been switched and selected to an image signal, an image superimposing unit 993 for superimposing the image signal generated by the image generating unit 991 over the image signal decoded by the image decoding unit 992, and an encoding unit 994 for encoding the image signal generated by the image superimposing unit 993.

The thirteenth aspect of the present invention is a television conference terminal unit 1000, comprising an image decoding unit 1095 for decoding the encoded data obtained by the encoding unit 994 of the multi-location control apparatus 990 to an image signal and image displaying unit 1096 for displaying an image corresponding to the image signal decoded by the image decoding unit 1095.

The code of background information is a location name, a conference room name, a section name of a speaking attendant, and the like.

In the multi-location control apparatus 990, the image generating unit 991 generates an image signal of background information corresponding to a background information number received from a television conference terminal unit 1050 at a conference room that has been switched and selected. The image decoding unit 992 decodes encoded data of an image signal of a conference room received from a television conference terminal unit that has been switched and selected. The image superimposing unit 993 superimposes the image signal of the background information over the image signal of the conference room. The encoding unit 994 encodes the superimposed image signal. A predetermined distributing unit distributes the encoded data to each of the television conference terminal units 1000.

In each of the television conference terminal units 1000, the image decoding unit 1095 decodes the encoded data into an image signal where an image signal of background information has been superimposed over an image of a conference room. The image displaying unit 1096 displays the superimposed image.

Thus, when the multi-location television conference system is constructed of the multi-location control apparatus 990 and the television conference terminal units 1000, an image of a conference room and background information thereof can be displayed as a superimposed image at each of conference rooms.

Figure 12:
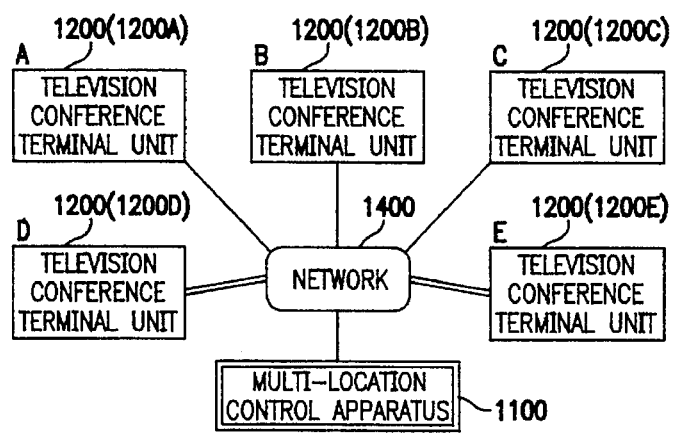
FIG. 12 is a block diagram showing overall construction of a multi-location television conference system according to a first embodiment of the present invention.

FIG. 12 is a schematic diagram showing an overall construction of a multi-location television conference system according to a first embodiment of the present invention.

In this drawing, a multi-location control apparatus 1100 is disposed in a center station. The multi-location control apparatus 1100 is connected to television conference terminal units 1200 (1200A, 1200B, 1200C, 1200D, and 1200E) of conference rooms disposed at five locations A, B, C, D, and E through a network such as an ISDN or a high speed digital dedicated line.

Figure 13:
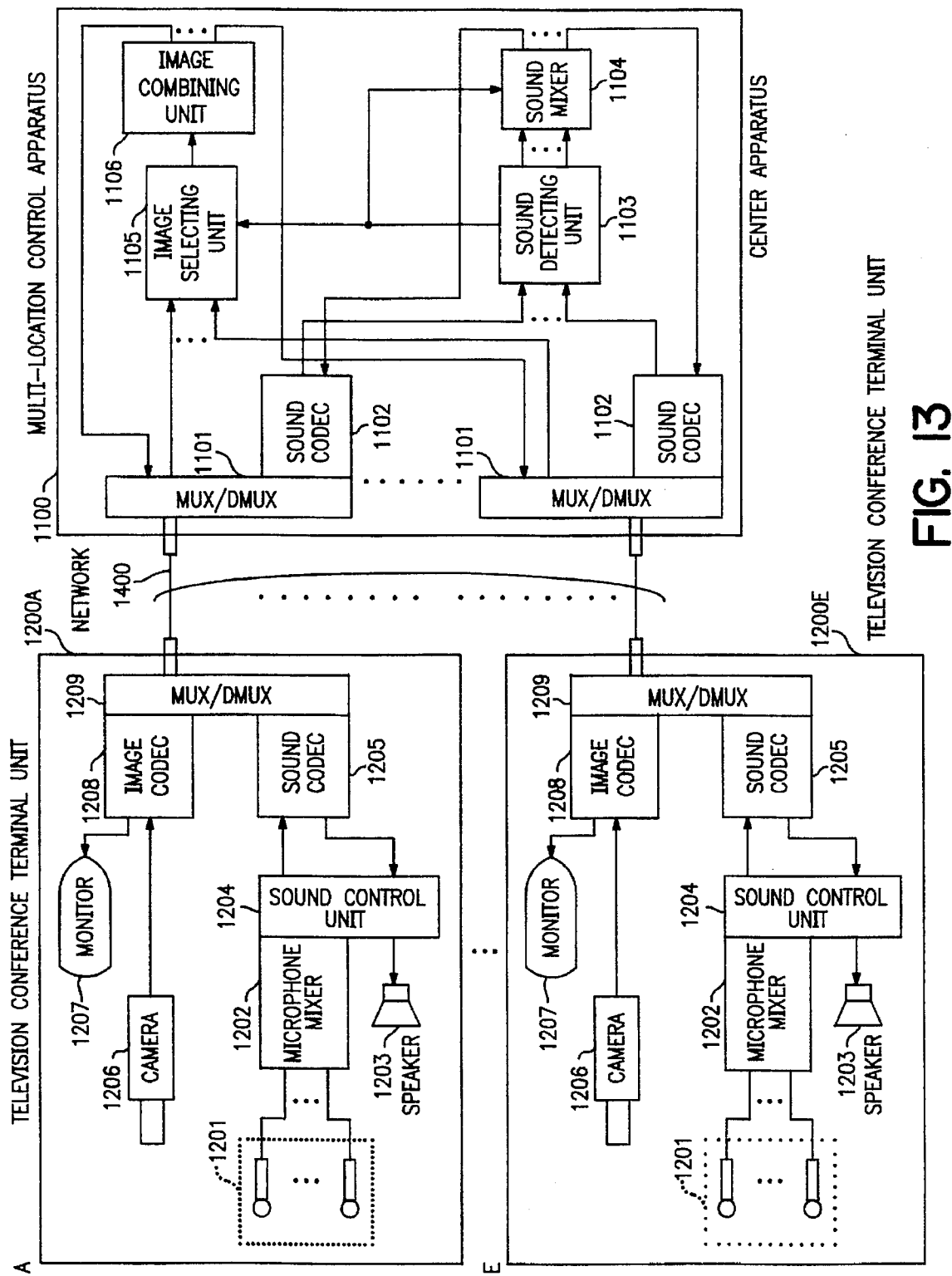
FIG. 13 is a block diagram showing detailed construction of the multi-location conference system according to the first embodiment.

FIG. 13 is a block diagram showing a detailed construction of the multi-location television conference system.

Each of the television conference terminal units 1200A to 1200E comprises a plurality of microphones 1201, a microphone mixer 1202, a speaker 1203, a sound control unit 1204, a sound encoding and decoding unit (sound CODEC) 1205, a camera 1206, a monitor 1207, an image CODEC 1208, and a multiplexing and demultiplexing unit (MUX/DMUX) 1209. The microphones 1201 are directed to attendants in a conference room. The microphone mixer 1202 mixes outputs of the microphones 1201. The speaker 1203 outputs a sound of another television conference terminal unit 1200. The sound control unit 1204 performs an input/output sound switching operation, an echo removing operation, or the like so as to prevent the output sound of the speaker 1203 from entering the microphones 1201. The sound CODEC 1205 encodes sound data received from the sound control unit 1204 and decodes sound data sent to the sound control unit 1204. The camera 1206 photographs the entire scene of the conference room, attendants, and/or materials. The monitor 1207 displays images of other conference rooms received from other television conference terminal units 1200. The image CODEC 1208 encodes image data photographed by the camera 1206 and decodes encoded data to an image to be displayed on the monitor 1207. The MUX/DMUX unit 1209 multiplexes and demultiplexes an input signal and an output signal of the sound CODEC 1205 and the image CODEC 1208.

The television conference terminal units 1200A to 1200E with the above-described construction are connected to the multi-location control apparatus 1100. The multi-location control apparatus 1100 comprises a multiplexing and demultiplexing (MUX/DMUX) unit 1101, a sound CODEC 1102, a sound detecting unit 1103, a sound mixer 1104, an image selecting unit 1105, and a screen combining unit 1106. The MUX/DMUX unit 1101 multiplexes sound data and image data received from the television conference terminal units 1200A to 1200E. In addition, the MUX/DMUX unit 1101 demultiplexes the multiplexed data into sound data and image data to be sent to the television conference terminal units 1200A to 1200E. The sound CODEC 1102 is connected to the MUX/DMUX unit 1101. The sound detecting unit 1103 detects occurrences of speeches at the locations A to E with levels of sound signals received from the sound CODECs 1102 of the television conference terminal units 1200A to 1200E. The sound mixer 1104 mixes the sound signals of the speaking locations detected by the sound detecting unit 1103 and sends the mixed sound signal to the speakers 1203 of the television conference terminal units 1200A to 1200E through the sound CODEC 1102 and the MUX/DMUX unit 1101. The image selecting unit 1105 receives sound signals from the sound detecting unit 1103, selects image data to be combined into one screen from image data of the locations A to E, and outputs image combining information. The image combining unit 1106 generates image data composed of a plurality of images of conference rooms received from the image selecting unit 1105 corresponding to the image combining information and distributes the combined image data to television conference terminal units 1200 of conference rooms at designated locations through the MUX/DMUX unit 1101.

The sound detecting unit 1103 detects a maximum number of speaking locations (for example, four locations), where images thereof can be displayed on the monitors 1207 of the television conference terminal units 1200A to 1200E. The sound detecting unit 1103 detects whether or not a sound level of each location exceeds a predetermined threshold value. In addition, the sound detecting unit 1103 determines whether or not the number of speaking locations exceeds the maximum number of locations. When the number of speaking locations exceeds the maximum number of locations, the speaking locations with larger sound levels are selected for the maximum number of locations. Thus, the locations A to E are categorized as speaking locations and listening locations.

The image selecting unit 1105 and the image combining unit 1106 combine image data of all the speaking locations that have been selected into image data of one screen.

Figure 14:
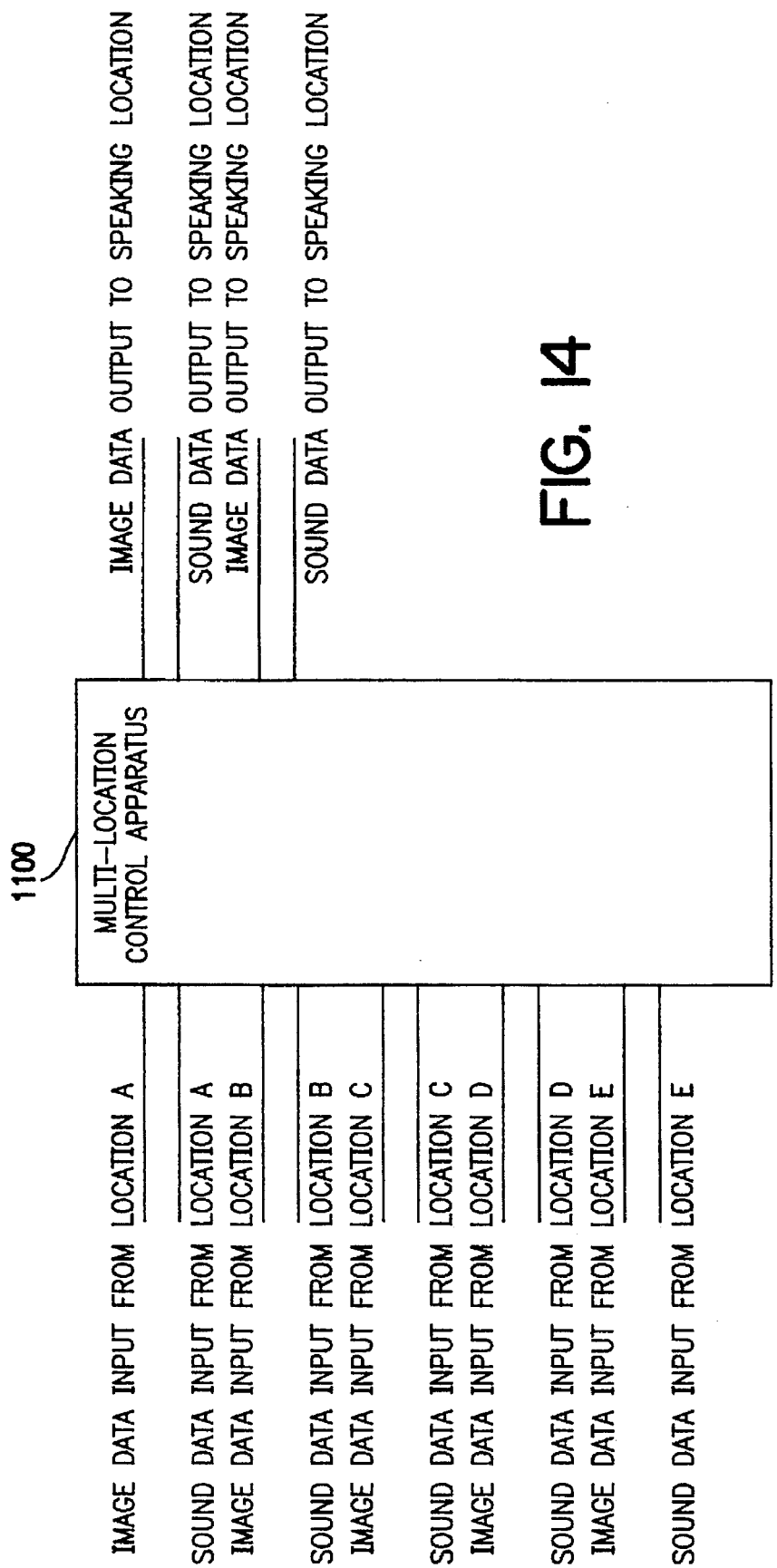
FIG. 14 is a block diagram for explaining a principle of operation of the first embodiment.

Image data displayed at each speaking location differs from image data displayed at each listening location. FIG. 14 shows input/output interface of image data and sound data between the multi-location control apparatus 1100 and each of the television conference terminal units 1200A to 1200E. In reality, as will be described later, an image that is output to each speaking location differs, location by location.

Sound data that the sound mixer 1104 outputs to speaking locations differ from sound data that the sound mixer 1104 outputs to listening locations. Likewise, image data that the image combining unit 1106 outputs to the speaking locations differ from image data that the image combining unit 1106 outputs to the listening locations. The sound mixer 1104 mixes sounds corresponding to images of the locations A to E. The mixing operation of the sound mixer 1104 is based on image combining information received from the image selecting unit 1105.

Next, an example of a display method in the case that attendants speak at the locations A to E will be described. FIGS. 15A–15B show display screens (monitor screens) on monitors 1207 of television conference terminal units 1200 in the case that attendants at four locations (in this case, locations A, B, C, and D) speak at the same time. FIG. 15A shows a display screen at a listening location (in this case, location E). FIG. 15B shows a display screen at a speaking location (in this case, location A).

In this case, since there are four speaking locations, the monitors 1207 at the locations A to E each display four divided screen images. In other words, the monitors 1207 at the listening locations each display four divided screen images showing images of four locations A, B, C, and D. The images displayed on the monitors 1207 at the listening locations are the same.

On the other hand, the monitor 1200 at the speaking location A displays images of three speaking locations B, C, and D and an image of the former speaking location E. As with the display screen of FIG. 15B, the monitors 1207 at the speaking locations B, C, and D displays images of speaking locations (other than the local location) and an image of the former speaking location E.

FIGS. 16A–16B show monitor screens in the case that attendants speak at two locations (in this case, locations A and B).

In this case, since there are two speaking locations, the monitors 1207 each display divided screen images of the two speaking locations.

As shown in FIG. 16B, the monitors 1207 at listening locations C, D, and E each display divided screen images of the speaking locations A and B. On the other hand, as shown in FIG. 16B, the monitor 1207 at the speaking location A displays divided screen images of the speaking location B and the former speaking location E. Likewise, the monitor 1207 at the speaking location B displays divided screen images of the other speaking location and the former speaking location E.

Thus, in the case that there are two speaking locations, the monitor 1207 at a listening location displays divided screen images of two speaking locations. On the other hand, the monitor 1207 at the speaking location displays divided screen images of the other speaking location and the former speaking location.

FIGS. 17A–17B show display screens of monitors in the case that there is one speaking location (location A).

In this case, the monitor screen is not divided. As shown in FIG. 17A, the monitors 1207 at listening locations B, C, D, and E each display an image of the speaking location A only. On the other hand, as shown in FIG. 17B, the monitor 1207 at the speaking location A displays an image of the former speaking location E only.

Thus, in the case that there is only one speaking location, the monitors 1207 at the listening locations each display an image of the speaking location only. On the other hand, the monitor 1207 at the speaking location displays an image of the former speaking location only.

However, in CCITT (Consultative Committee for International Telephony and Telegraphy) Recommendation H. 261, which is a motion picture communication image encoding standard using a primary subrate from 64 kb/s to 2 Mb/s, a common intermediate format has been defined as an image codec standard for a visual telephone and television conference. In addition, for low-bit rate simple terminal units such as small visual telephones, QCIF (Quarter CIF) where the horizontal and vertical resolutions are half of the CIF has been also defined.

Figure 18:
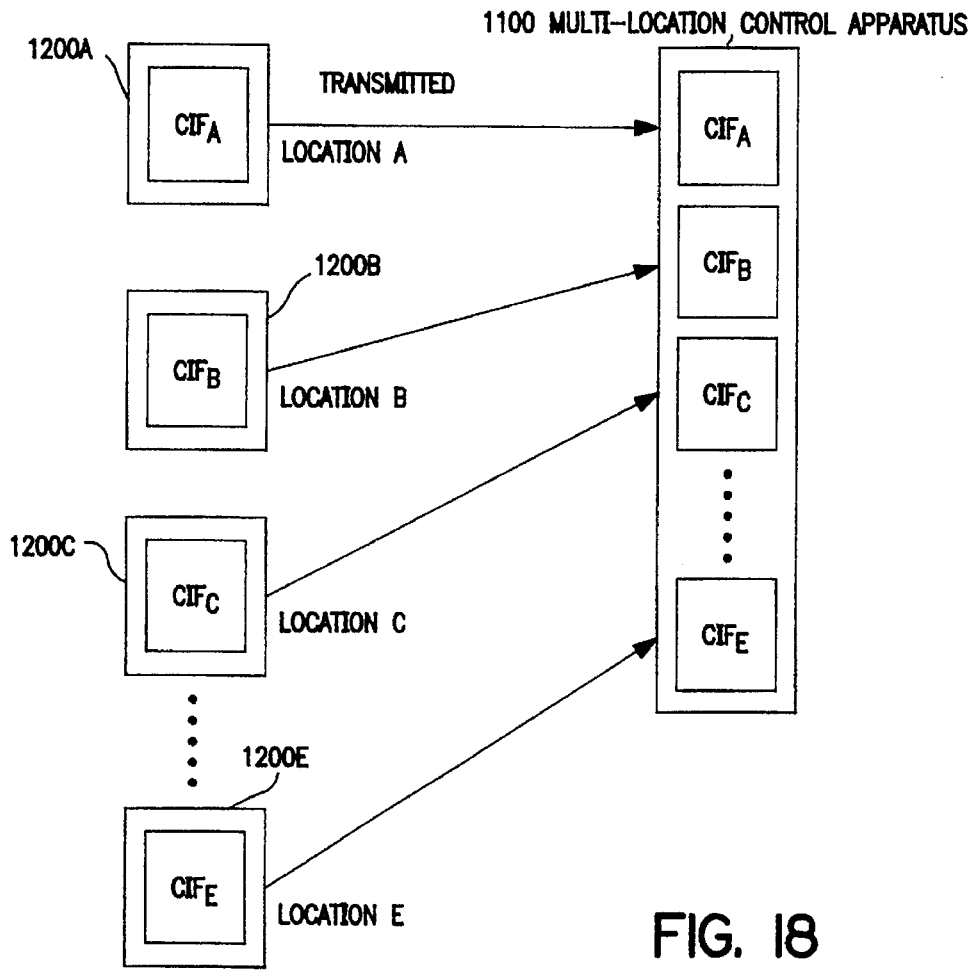
FIG. 18 is a schematic diagram showing an example of a transmitting method of an image signal from each television conference terminal unit to the multi-location control apparatus.
Figure 19:
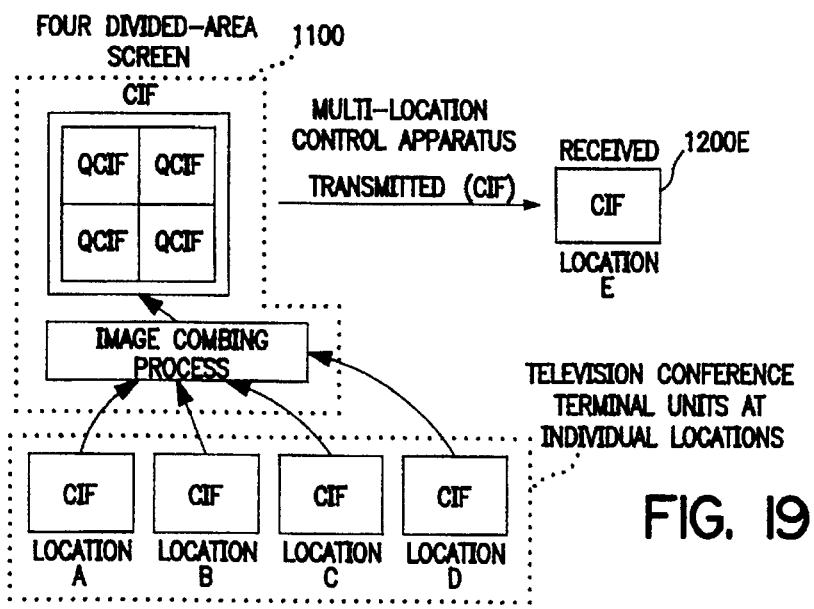
FIG. 19 is a schematic diagram showing an example of a generating method of an image signal displayed on four divided areas of one screen.

FIG. 18 is a schematic diagram for explaining a method for transmitting image data from the television conference terminal units 1200A to 1200E at locations A to E to the multi-location control apparatus 1100 with CIF. FIG. 19 is a schematic diagram for explaining a method for displaying images of four locations in four divided screen areas at a time as shown in FIG. 15A.

The multi-location control apparatus 1100 is provided with a CIF/QCIF converter that converts image data of locations A, B, C, and D of CIF format into data of QCIF format. The image data of the QCIF format at the four locations are combined to one screen so that the images of the four locations A, B, C, and D shown in FIG. 15A are displayed on one screen at a time. The combined data is sent to the television conference terminal unit 1200E at the location E.

When there is one speaking location as shown in FIGS. 17A–17B, the multi-location control apparatus 1100 selects and outputs the received image data of the CIF format to the television conference terminal units 1200 at the listening locations through the image selecting unit 1105 and the image combining unit 1106, not through the CIF/QCIF converter.

Next, with reference to flow charts shown in FIGS. 20 to 22, an image output process (image data transmitting process) of the multi-location control apparatus 1100 for the television conference terminal units 1200A to 1200E at the locations A to E will be described.

Figure 20:
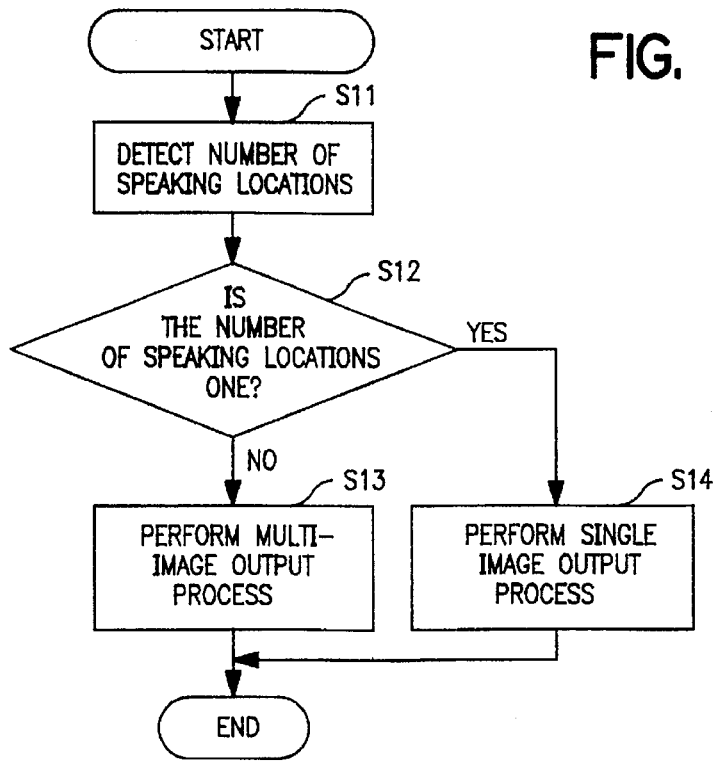
FIG. 20 is a flow chart for explaining overall operation of the first embodiment.

FIG. 20 is a main flow chart showing the image output process.

In this drawing, the sound detecting unit 1103 detects the number of speaking locations (at step S1). The multi-location control apparatus 1100 determines whether or not the number of speaking locations is one according to the detected result (at step S12). When there are a plurality of speaking locations (determined result at step S12 is NO), the multi-location control apparatus 1100 performs a multi-image output process that causes images of a plurality of locations to be displayed as divided screen images on the monitors 1207 of the television conference terminal units 1200 at the locations A to E (at step S13). When there is one speaking location (the determined result at step S12 is YES), the apparatus 1100 performs a single image output process that causes an image of one speaking location to be displayed on the monitors 1207 at the locations A to E (at step S14).

Figure 21:
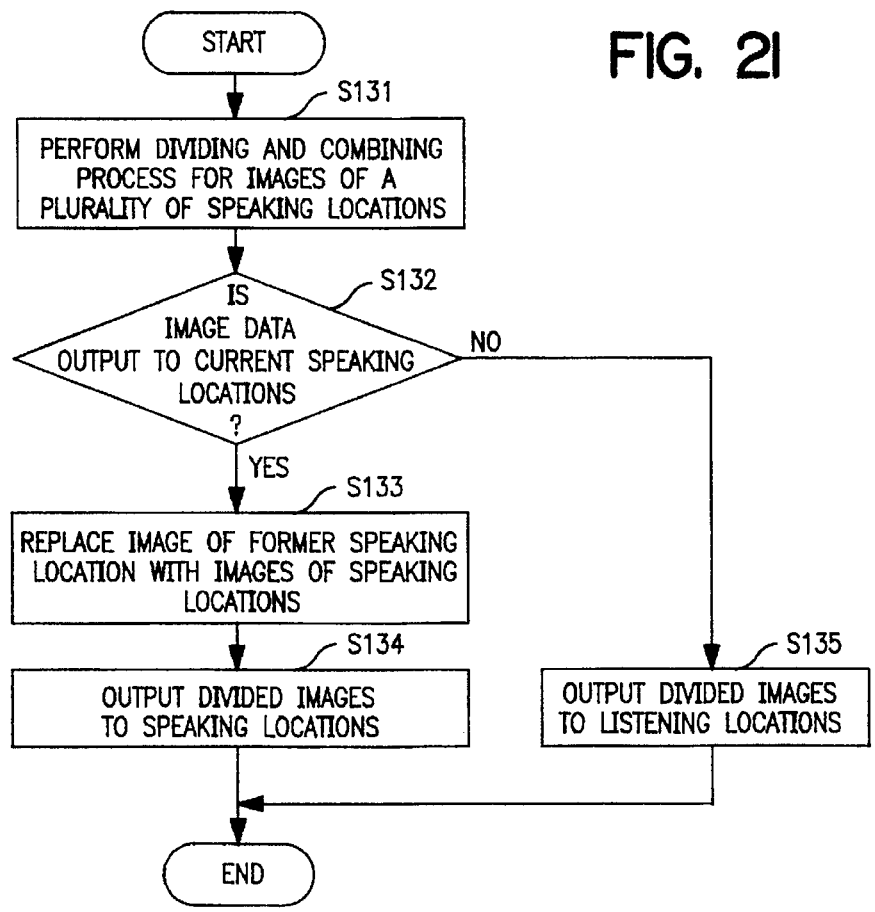
FIG. 21 is a flow chart for explaining operation in the case that speeches take place at a plurality of locations at the same time.

FIG. 21 is a flow chart showing the multi-image output process (S13).

In this process, images of a plurality of speaking locations are combined into one frame (at step S131). Thus, the images shown in FIGS. 15A and 16A are formed.

The apparatus 1100 determines whether or not the output destination of the image data is current speaking locations (at step S132).

When the output destination is current speaking locations (determined result at step S132 is YES), the apparatus 1100 replaces image data of speaking locations with image data of the former speaking location (at step S133). Thus, the apparatus 1100 outputs (transmits) the divided screen image data to the current speaking locations (at step S134).

Thus, when the speaking location is location A, the divided screen image data shown in FIG. 15A or FIG. 16A is replaced with the divided screen image data shown in FIG. 15B or FIG. 16B, respectively. The apparatus 1100 outputs the divided screen image data to the television conference terminal unit 1200A at the location A.

When the output destination at step S132 is listening locations rather than current speaking locations, the apparatus 1100 outputs (transmits) the combined image data (at step S131) to these listening locations (at step S135).

Thus, the divided screen image data shown in FIGS. 15A or FIG. 16A is sent to the television conference terminal unit 1200E at the location E, which is a listening location.

Figure 22:
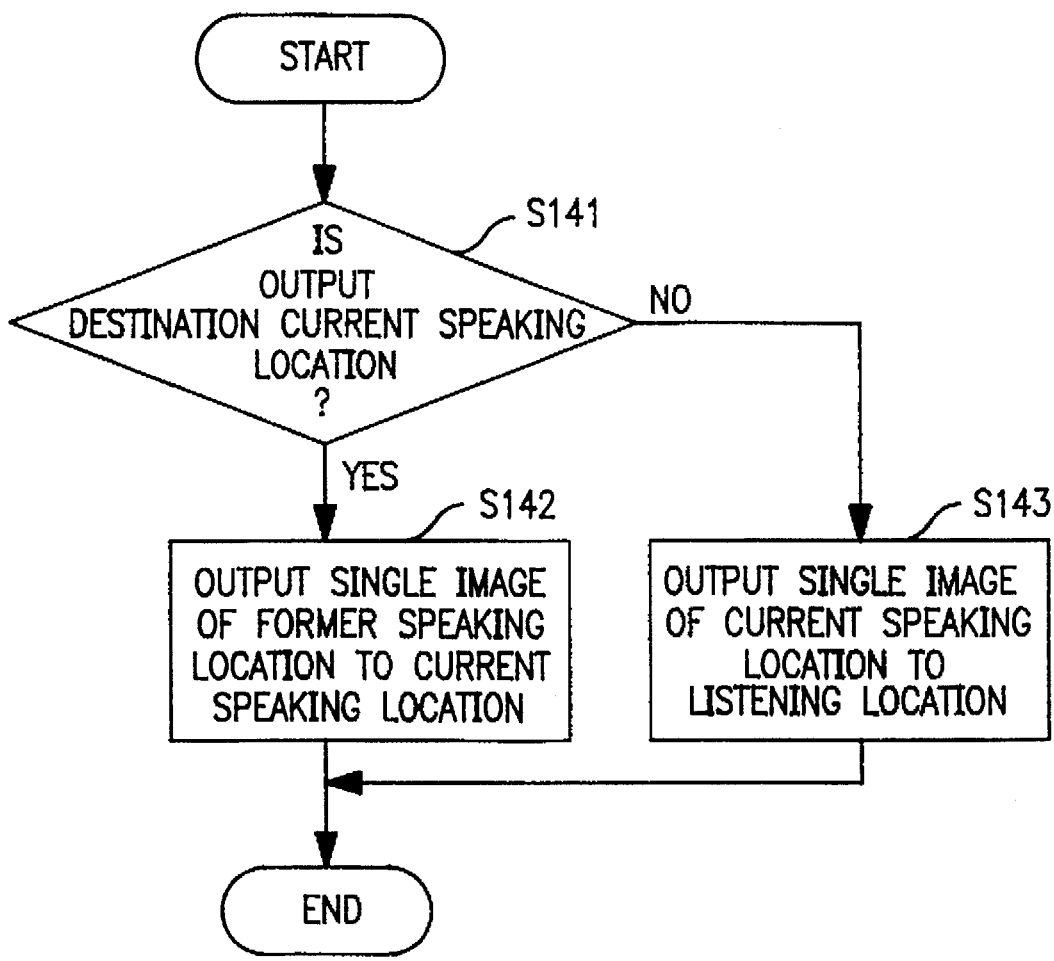
FIG. 22 is a flow chart for explaining operation in the case that a speech takes place at one location.

FIG. 22 is a flow chart showing the single image output process S14.

In this process, the apparatus 1100 determines whether or not the output destination (transmission destination) of the divided screen image data is current speaking locations (at step S141). When the output destination is current speaking locations (determined result is YES), the apparatus 1100 outputs (transmits) single image data that is image data of the former speaking location to the television conference terminal units 1200 at the current speaking locations (at step S142).

Thus, the apparatus 1100 transmits the single image data of the former speaking location in the format shown in FIG. 17B to, for example, the location A, which is a single speaking location.

On the other hand, when the output destination is a listening location at step S141, the apparatus 1100 outputs (transmits) the single image data of the current speaking location to the television conference terminal unit 120 at the listening location (at step S143).

Thus, when only the location A is a speaking location, the apparatus 1100 outputs (transmits) single image data of the current speaking location A in the format shown in FIG. 17A to the listening locations B, C, D, and E.

In this embodiment, the multi-location control apparatus 1100 detects speaking locations. However, it should be appreciated that each of the television conference terminal units 1200 may detect speaking attendants at respective locations and sends speech detecting data (along with sound level data if necessary) to the multi-location control apparatus 1100.

Figure 23:
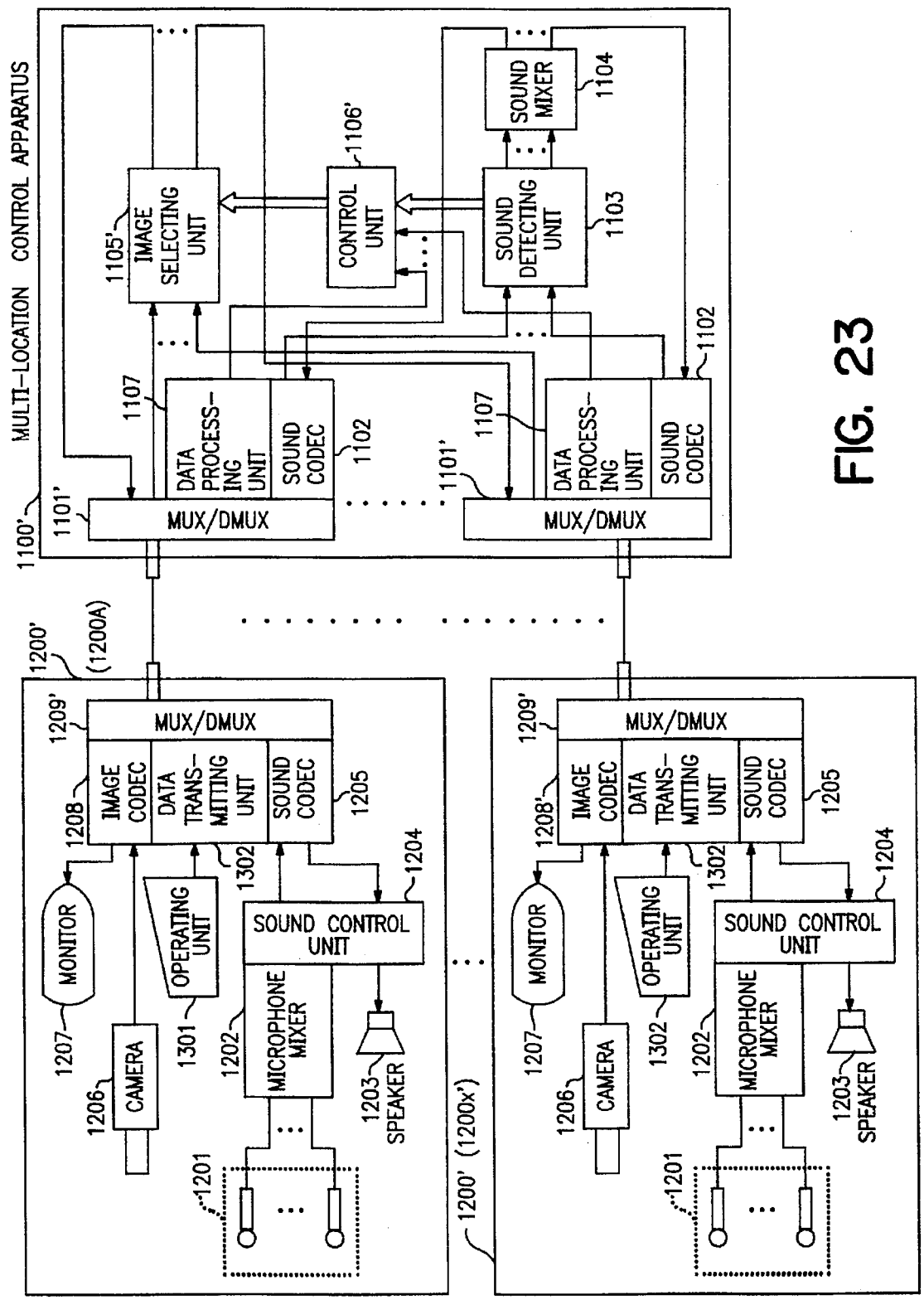
FIG. 23 is a block diagram showing overall construction of a multi-location television conference system according to a second embodiment of the present invention.

FIG. 23 is a block diagram showing an overall construction of a television conference system according to a second embodiment of the present invention. Television conference terminal units 1200' and a multi-location control apparatus 1100' of this system partially differ from those of the embodiment shown in FIG. 13. For simplicity, the same elements of FIG. 23 as that of FIG. 13 are denoted by the same reference numerals.

The television conference terminal unit 1200' further comprises an operating unit 1301 and a data transmitting unit 1302. With the operating unit 1301, the user of the television conference terminal unit 1200' can perform (1) a displaying conference room switching operation, (2) a designated mode switching operation, (3) a automatic conference room switching enable/disable designating operation, (4) a remote location camera control operation, and (5) a designated mode forced changing operation. The data transmitting unit 1302 converts an operating signal received from the operating unit 1301 into a signal in a predetermined format and outputs the resultant signal to a multiplexing and demultiplexing (MUX/DMUX) unit 1209'. The MUX/DMUX unit 1209' multiplexes image data received from an image CODEC 1208, sound data received from a sound CODEC 1205, and the operating data received from the data transmitting unit 1302 and then outputs the multiplexed data to the multi-location control apparatus 1100'.

Each of the MUX/DMUX unit 1101' of the multi-location control apparatus 1100' has a data processing unit 1107. The data processing unit 1107 extracts the operating data, which is received from the television conference terminal units 1200A' to 1200X', from the MUX/DMUX unit 1101'. The data processing unit 1107 outputs the extracted operating data to the control unit 1106'.

Figure 24:
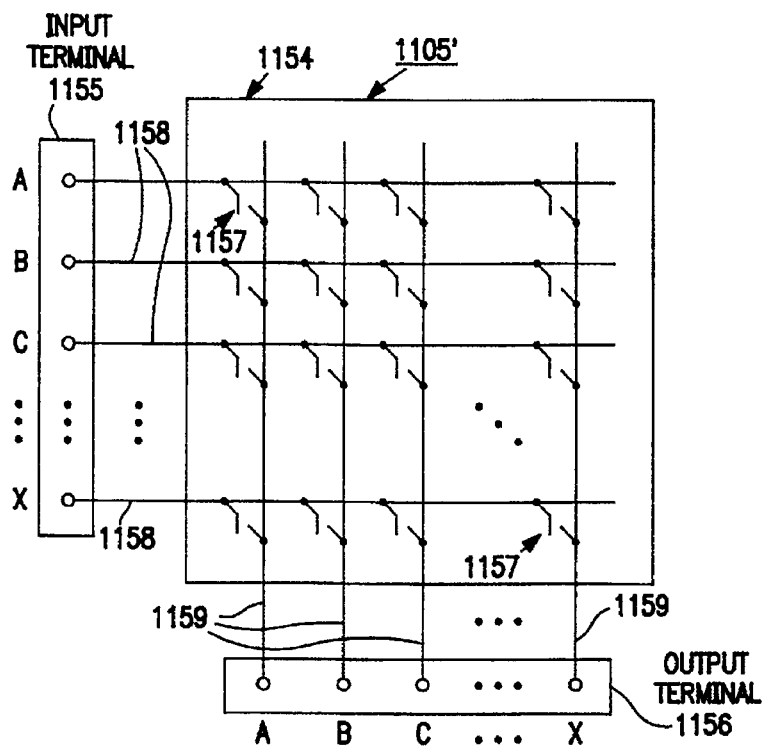
FIG. 24 is a schematic diagram showing detailed construction of an image selecting unit.

FIG. 24 is a schematic diagram showing an inner construction of the image selecting unit 1105'.

As shown in this drawing, the image selecting unit 1105' comprises n input terminals 1155 and n output terminals 1156. The n input terminals 1155 receive image data from the conference rooms A, C, . . . , and X. The n output terminals 1156 send image data to the conference rooms A, B, C, . . . , and X. The n input terminals 1155 and the n output terminals are connected to n input lines 1158 and n output lines 1159 of n×n switch elements 1157 that are disposed in a matrix shape. Thus, the n input terminals 1155 can be connected to the n output terminals 1156 through the n switch elements 1157 so that image data of any conference room can be sent to the television conference terminal units 1200' of the conference rooms A, B, C, . . . , and X. An array of the switch elements 1157 disposed in an n×n matrix shape is referred to as a matrix switcher 1154. Since the image selecting unit 1105' has such a construction, at each of the conference room of the system according to this embodiment, an independent designating mode can be selected in addition to the above-described NS/PS designating mode.

The independent designating mode is a mode in which an image of a desired conference room can be independently selected without an influence of operations and speeches in other conference rooms. In this embodiment, even in the independent designating mode, when a speaking attendant is detected, the user can enable or disable the automatic NS switching mode.

In addition, a chairman conference room (main conference room) that can forcedly switch modes of all other conference rooms to a desired mode can be designated.

Figure 25:
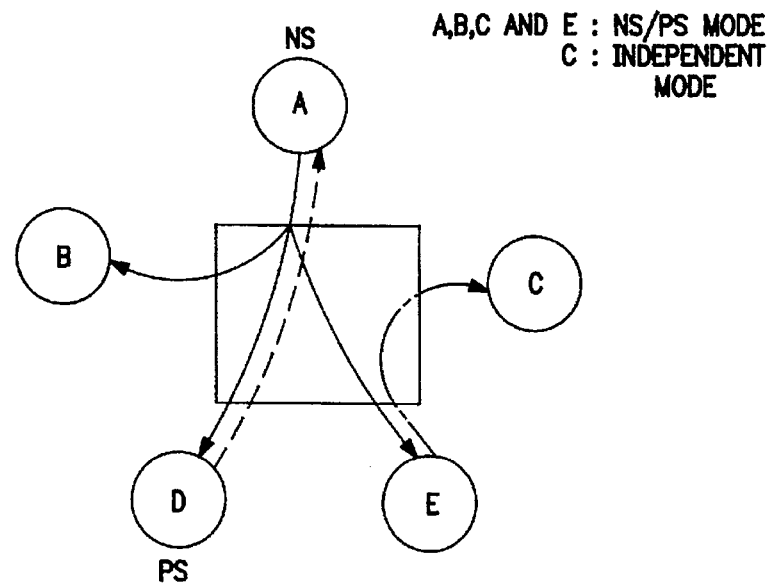
FIG. 25 is a schematic diagram for explaining outlined operation of the second embodiment.

FIG. 25 is a schematic diagram showing an example of an operation of this embodiment in the case that both the NS/PS designating mode and the independent designating mode are present.

In this drawing, the conference rooms A, B, C, D, and E have been designated to the NS/PS designating mode, whereas only the conference room C has been designated to the independent designating mode.

In this condition, when the conference room A is designated to the NS mode, the monitors at the conference rooms B, D, and E each display an image of the conference room A as represented by a solid arrow of the drawing. On the other hand, the monitor at the conference room A displays an image of the conference room D that has been designated to the PS mode as represented by a dotted arrow of the drawing. The monitor at the conference room C that has been designated to the independent designating mode displays an image of the designated conference room E as represented by a one-dashed arrow of the drawing.

FIGS. 26 to 29 show various management tables that the control unit 1106' provides. With these management tables, the control unit 1106' controls image data to be transmitted to the television conference terminal units 1200A' to 1200X'.

FIG. 26 is a schematic diagram showing a construction of a mode management table for managing modes designated to the conference rooms A, B, . . . , and X. In addition to the above-described "designated mode", this table contains "automatic conference room switching flag" and "chairman flag". The automatic conference room switching flag represents whether the automatic switching of an image of a conference room is enabled or disabled when a speaking attendant is detected under the independent designating mode. The chairman flag represents whether each conference room is a chairman room. In these flags, the automatic conference room switching flag is valid only for conference rooms that have been designated to the independent designating mode.

FIG. 27 is a schematic diagram showing a construction of an NS/PS management table. This table is used to manage whether each of the conference rooms has been designated to "NS", "PS", or "S" mode. The "S" mode represents a conference room that has been designated to other than "NS" and "PS" modes.

FIG. 28 is a schematic diagram showing a construction of a displaying conference room table that is used to manage conference rooms currently displayed on the monitors 1207 at the conference rooms.

FIG. 29 is a schematic diagram showing a construction of a matrix switcher status table that is used to manage current statuses of the switch elements 1157 of the matrix switcher 1154. In the drawing, mark "O" represents on status, whereas mark "X" represents off status.

In this embodiment of the present invention, the multi-location control apparatus 1100' of the center station receives the following events (1) to (6) from the television conference terminal units 1200A', 1200B', . . . , and 1200X' at the conference rooms A, B, . . . , and X.
(1) Speaking attendant detecting event
(2) Displaying conference room switching event
(3) Designated mode switching event
(4) Automatic conference room switching enable/disable designating event
(5) Remote location camera control event
(6) Designated mode forced changing event Next, with reference to flow charts, operations of the control unit 1106' corresponding to occurrences of these events will be described.

Before such events take place, parameters in these tables have been designated as shown in FIGS. 26 to 29.

In other words, as shown in the mode management table of FIG. 26, the conference rooms A, D, . . . , and X have been designated to the NS/PS designating mode and the conference rooms B and C have been designated to the independent designating mode. The automatic conference room switching flag for the conference room B has been designated to the enable state. The automatic conference room switching flag for the conference room C has been designated to the disable state. The conference room A has been designated to a chairman conference room.

As shown in the NS/PS management table of FIG. 27, the conference room A has been designated to "NS" mode and the conference room D has been designated to "PS" mode. The other conference rooms have been designated to "S" mode.

In addition, as shown in the displaying conference room management table of FIG. 28, the television conference terminal units 1200D', . . . , and 1200X' at the conference rooms D, . . . , and X display an image of the conference room A that has been designated to "NS" mode. On the other hand, the television conference terminal unit 1200A' that has been designated to "NS" mode displays an image of the conference room D that has been designated to "PS" mode. The television conference terminal units 1200B' and 1200C' at the conference rooms B and C each display images of the conference rooms C and D that have been selected at the conference rooms B and C, respectively.

FIG. 29 shows statuses of the switch elements 1157 of the matrix switcher 1154 corresponding to the above-described displaying modes.

Figure 30:
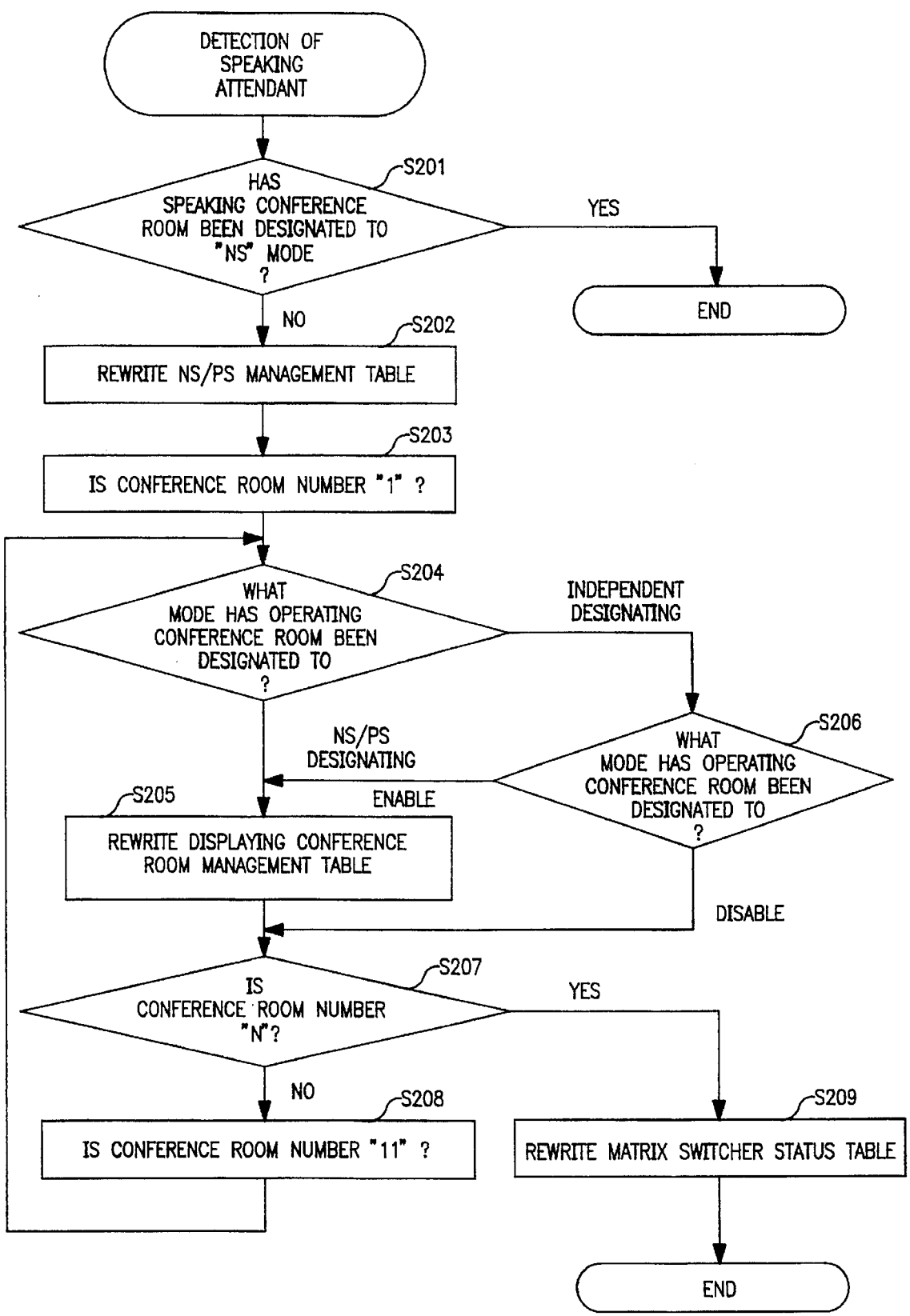
FIG. 30 is a flow chart showing operation corresponding to an occurrence of a speaking attendant detecting event.

Next, with reference to a flow chart shown in FIG. 30, the operation of the control unit 1106' corresponding to an occurrence of (1) speaking attendant detecting event will be described.

When the control unit 1106' receives a speech detecting signal from the sound detecting unit 1103, the control unit 1106' determines whether or not the informed speaking attendant (the speaking conference room) has been designated to "NS" mode with reference to the NS/PS management table (at step S201).

When the speaking conference room has been designated to NS mode, the control unit 1106' rewrites the NS/PS management table so that the speaking conference room is designated to NS mode and a conference room that has been designated to NS mode is designated to PS mode (at step S202).

Thus, when an attendant speaks at the conference room X, the control unit 1106' rewrites the PS/NS management table as shown in FIG. 31A. In other words, as the conference room X is changed to NS mode, the conference room A, which has been designated to NS mode, is changed to PS mode, and the conference room D, which has been designated to PS mode, is changed to S mode.

The control unit 1106' initializes the conference room number to "1" (at step S203). The control unit 1106' determines the current designated mode of a conference room with this conference room number with reference to the mode management table (at step S204). When the conference room has been designated to the NS/PS designating mode, since the image of the conference room is switched, the control unit 1106' correspondingly rewrites the displaying conference room management table (at step S205).

When the conference room has been designated to the independent designating mode (at step S204), the control unit 1106' determines whether the conference room has been designated to the automatic conference room switching enable mode with reference to the automatic conference room switching flag (at step S206).

When the conference room has been designated to the automatic conference room switching enable mode, since the image of the conference room is next designated to NS mode, the control unit 1106' correspondingly rewrites the displaying conference room table (at step S205). When the conference room has been designated to the automatic conference room switching disable mode, since the image of the conference room is not switched, the control unit 1106' does not rewrite the displaying conference room table.

The control unit 1106' repeats the above-described steps S204 to S206 for all the conference rooms in the ascending order of the conference room numbers (at step S207 and S208).

Thus, the control unit 1106' rewrites the displaying conference room management table so that the contents as shown in FIG. 28 are changed to those as shown in FIG. 31B. In other words, the displaying conference room management table is rewritten so that the monitor at the conference room A that is designated to PS mode displays an image of the conference room X that is designated to NS mode and the monitor at the conference room D of which the mode in changing from PS to S displays an image of the conference room X that is designated to NS mode. In addition, since the conference room B has been designated to the independent designating mode and the automatic conference room switching enable mode, the displaying conference room management table is rewritten so that the monitor at the conference room B displays an image of the conference room X that is designated to NS mode. In addition, the displaying conference room management table is rewritten so that the monitors at the remaining conference rooms E, . . . , and so forth (not shown) each display an image of the conference room X. Since the monitor at the conference room X displays an image of the conference room A that is newly designated to PS mode, the displaying conference room management table is not rewritten.

After the displaying management room management table has been rewritten, the control unit 1106' rewrites the matrix switcher status table corresponding to the contents of the displaying management room management table (at step S208).

Thus, the matrix switcher status table is rewritten so that the contents as shown in FIG. 29 are changed to those as shown in FIG. 31C.

When the speaking conference room has been designated to NS mode at step S201, since NS and PS modes are not changed, the control unit 1106' immediately terminates the process without rewriting the matrix switcher status table. Thus, images displayed on the monitors 1207 at the conference rooms A, B, . . . , and X are not switched.

Figure 32:
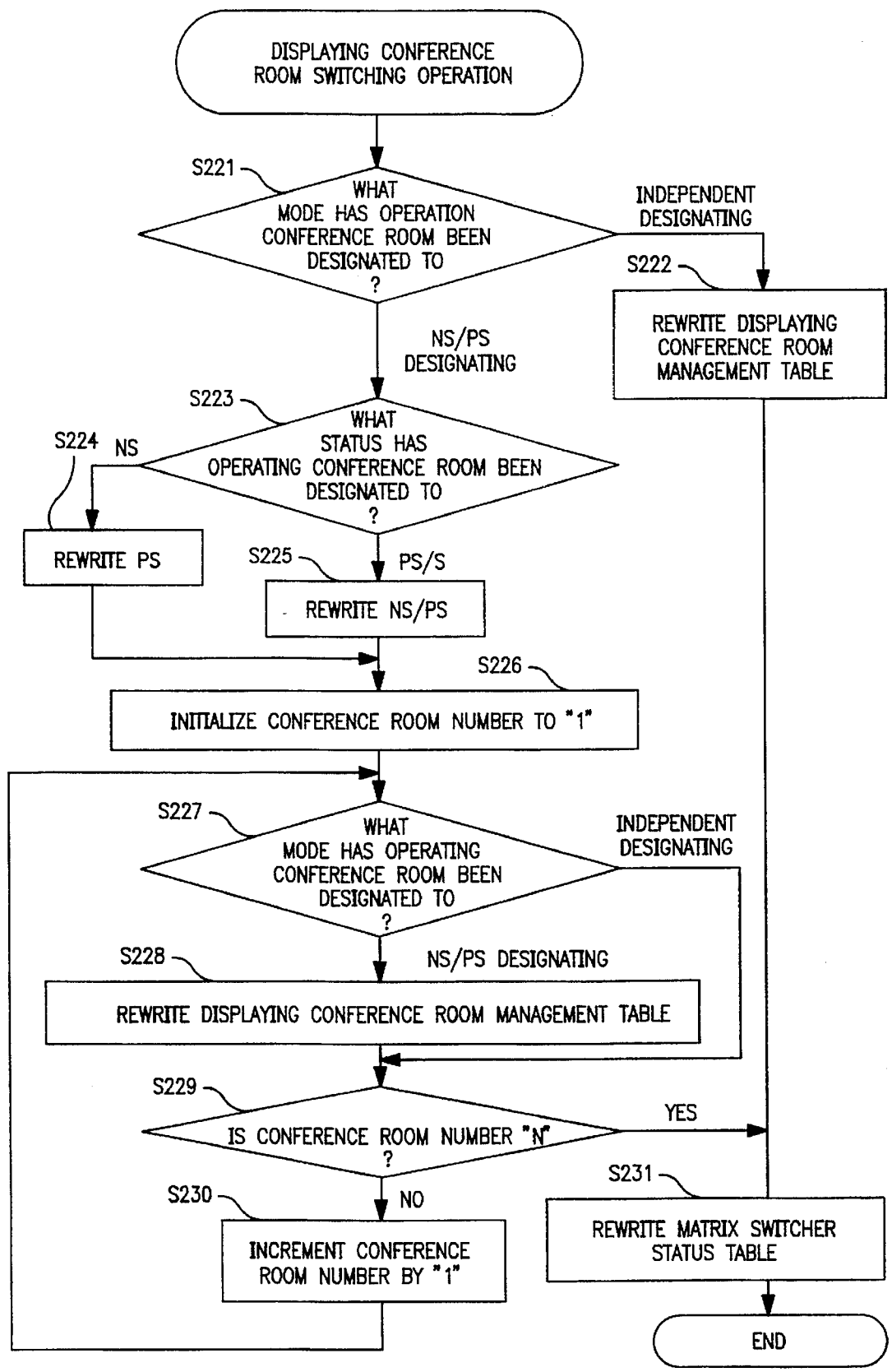
FIG. 32 is a flow chart of displaying conference room switching operation.

Next, with reference to a flow chart shown in FIG. 32, the operation of the control unit 1106' corresponding to an occurrence of (2) displaying conference room switching event will be described.

When a displaying conference room switching operation is performed at any conference room with the operating unit 1301 of the television conference terminal unit 1200', the control unit 1106' determines the mode of the operating conference room with reference to the mode management table (at step S221).

When the operating conference room has been designated to the independent designating mode, the control unit 1106' rewrites the displaying conference room management table so that the column of this conference room of this table represents the designated conference room (at step S222). In addition, the control unit 1106' rewrites the matrix switcher status table corresponding to the contents of the rewritten displaying conference room management table (at step S231).

Thus, in the case that the contents of these tables are as shown in FIGS. 26 to 29, when the user in the conference room B switches the monitor 1207 to an image of the conference room X, the displaying conference room management table is rewritten so that only the column of the conference room of this table B represents the conference room X instead of the conference room C. Thus, the matrix switcher status table is rewritten so that the contents as shown in FIG. 29 are changed to the contents shown in FIG. 33B.

Thus, the user at a conference room that has been designated to the independent designating mode can switch an image of a desired conference room disposed on the user's monitor 1207 independently of the other conference rooms.

When the operating conference room (at step S221) has been designated to the NS/PS designating mode, the control unit 1106' determines whether or not the conference room has been designated to NS mode with reference to the NS/PS management table (at step S223). When the operating conference room has been designated to NS mode, the control unit 1106' rewrites the NS/PS management table so that the column of the designated conference room of this table represents PS mode and the column of a conference room that has been designated to PS mode represents S mode (at step S224). In other words, since a monitor at a conference room that has been designated to NS mode displays an image of a conference room that has been designated to PS mode, the control unit 1106' correspondingly rewrites the NS/PS management table.

Thus, when the user at the conference room A that has been designated to NS mode performs a switching operation that displays an image of the conference room X on the user's monitor 1207, the NS/PS management table is rewritten so that the contents as shown in FIG. 27 are changed to those as shown in FIG. 34A.

On the other hand, when the operating conference room (at step S223) has been designated to PS or S, the control unit 1106' rewrites the NS/PS management table so that the column of the designated conference room represents NS, the column of the conference room that has been designated to NS mode represents PS, and the column of the conference room that has been designated to PS mode represents S (at step S225).

Thus, when the user at the conference room D that has been designated to PS mode performs a switching operation that displays an image of the conference room X on the user's monitor 1207, the NS/PS management table is rewritten so that the contents as shown in FIG. 27 are changed to those as shown in FIG. 35A.

After rewriting the NS/PS management table, the control unit 1106' initializes the conference room number to "1" (at step S226).

The control unit 1106' determines whether the conference room corresponding to the conference room number has been designated to the NS/PS designating mode or the independent designating mode with reference to the mode management table (at step S227). When the conference room has been designated to the NS/PS designating mode, the control unit 1106' rewrites the column of the conference room of the displaying conference room management table corresponding to the contents of the NS/PS management table (at step S228). In other words, the control unit 1106' rewrites the NS/PS management table so that a monitor of a conference room that has been designated to NS mode displays an image of a conference room that has been designated to PS mode and monitors at other conference rooms each display at an image of a conference room that has been newly designated to NS mode.

When the conference room (at step S227) has been designated to the independent designating mode, since this conference room is not affected by a switching operation of another conference room, the control unit 1106' does not rewrite the displaying conference room management table.

The control units 1106' repeats the above-described steps S227 to S228 for all the conference rooms in the ascending order of the conference room numbers (at step S229 and S230). After completing this process, the control unit 1106' rewrites the matrix switcher status table corresponding to the contents of the displaying conference room management table (at step S231).

Thus, when the user at the conference room A that has been designated to NS mode performs a switching operation that displays an image of the conference room X, the control unit 1106' rewrites the displaying conference room management table so that only the column of the conference room A represents the conference room X instead of the conference room D, as shown in FIG. 34B. When the user at the conference room D that has been designated to S mode performs a switching operation that displays an image of the conference room A, the control unit 1106' rewrites the displaying conference room table so that the contents as shown in FIG. 28 are changed to those as shown in FIG. 35B. In other words, the control unit 1106' rewrites the displaying conference room table so that the column of a conference room that has been designated to PS or S mode among conference rooms designated to PS or S mode among conference rooms which are in the NS/PS designating mode represents the conference room X that is designated to NS mode. In these cases, the control unit 1106' rewrites the matrix switcher status table as shown in FIGS. 34C and 35C.

Figure 36:
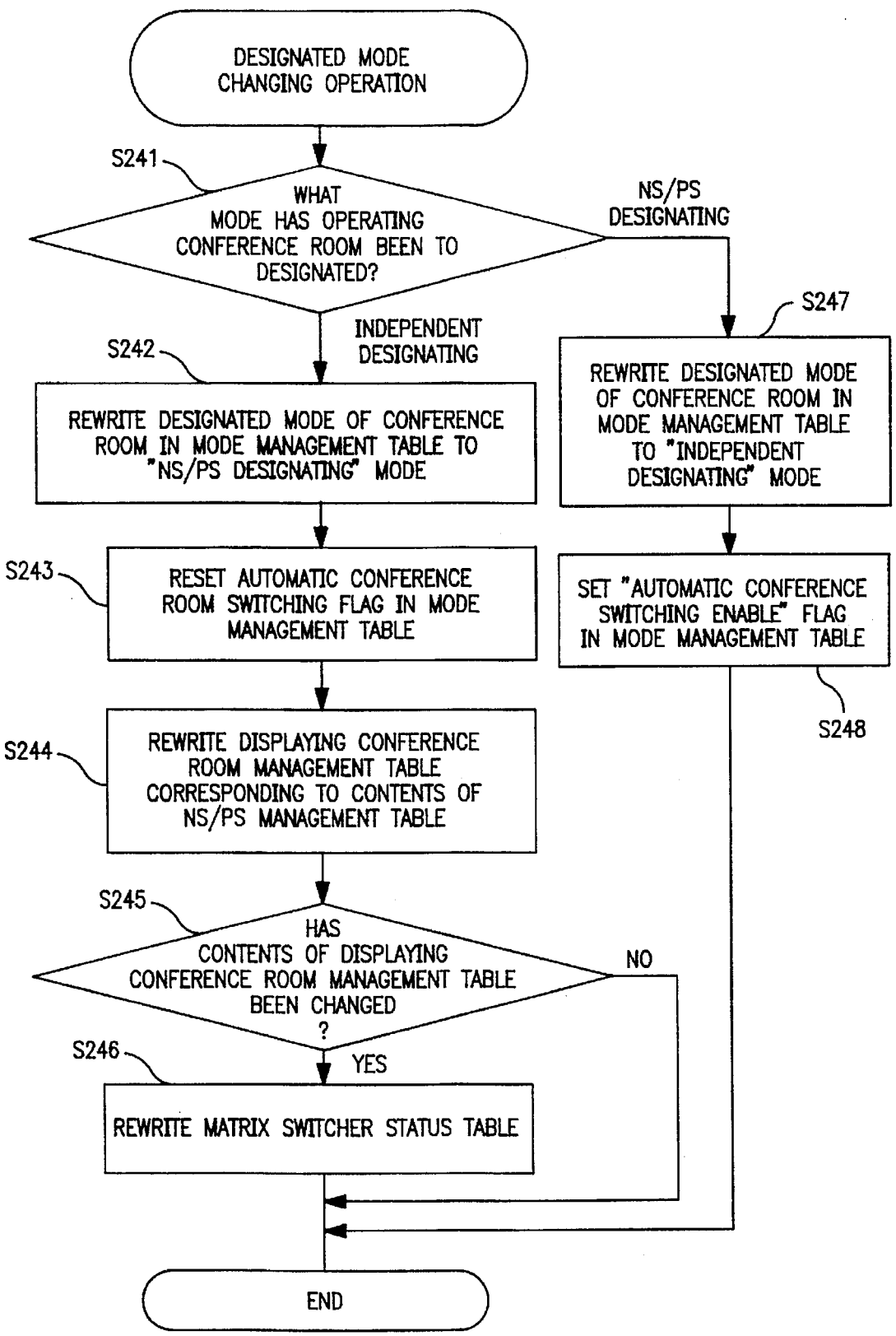
FIG. 36 is a flow chart of designated mode changing operation.

Next, with reference to a flow chart shown in FIG. 36, the operation of the control unit 1106' corresponding to an occurrence of (3) a designated mode changing event will be described.

When the user at a conference room performs a designated mode changing operation with the operating unit 1301 of the television conference terminal unit 1200', the control unit 1106' determines whether the operating conference room has been designated to the independent designating mode or the NS/PS designating mode with reference to the mode management table (at step S241).

When the operating conference room has been designated to the independent designating mode, the control unit 1106' rewrites the mode management table so that the mode of the conference room is changed to the NS/PS designating mode (at step S242). In addition, the control unit 1106' resets the automatic conference room switching flag of the conference room in the mode management table corresponding to the mode switching operation (at step S243). Then, the control unit 1106' rewrites the displaying conference room management table so that the column of this conference room represents a conference room that has been designated to NS mode with reference to the NS/PS management table (at step S244).

The control unit 1106' determines whether the contents of the displaying conference room management table have been changed (at step S245). When the contents have been changed, the control unit 1106' rewrites the matrix switcher status table corresponding to the contents of the displaying conference room management table (at step S246).

Thus, when the user at the conference room B that has been designated to the independent designating mode performs a designated mode changing operation, the control unit 1106' rewrites the mode management table so that the contents as shown in FIG. 26 are changed to the contents shown in FIG. 37A. Next, the control unit 1106' rewrites the displaying conference room management table as shown in FIG. 37C so that the column of the conference room B represents the conference room A that has been designated to NS mode instead of the conference room D with reference to the NS/PS management shown in FIG. 37B. In addition, the control unit 1106' rewrites the matrix switcher status table so that the statuses of the switch elements 1157 corresponding to the conference room B are changed as shown in FIG. 37D corresponding to the contents of the displaying conference room management table. When the monitor at the conference room B displays an image of the conference room A that has been designated to NS mode, since the image displayed on the monitor is not changed, the control unit 1106' does not rewrite the displaying conference room management table and the matrix switcher status table.

When the operating conference room has been designated to the NS/PS designating mode (at step S241), the control unit 1106' rewrites the mode management table so that the designated mode of the conference room is changed to the independent designating mode (at step S247) and sets the automatic conference room switching flag to "enable" (at step S248).

Thus, when the user at the conference room D performs a designated mode changing operation, the control unit 1106' rewrites the mode management table so that the designated mode of the conference room D and the automatic conference room switching flag are changed as shown in FIG. 38.

Figure 39:
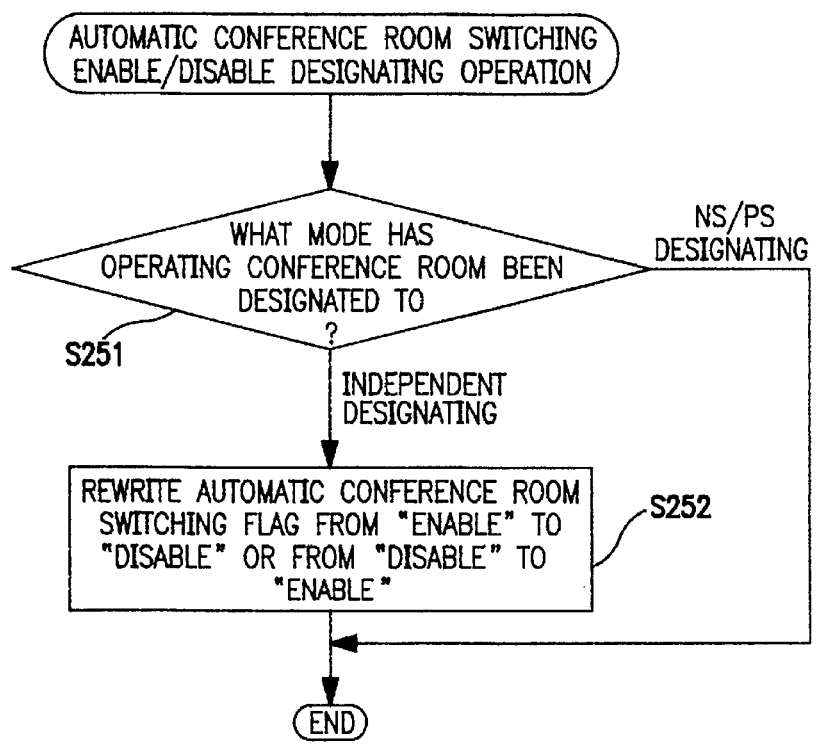
FIG. 39 is a flow chart of automatic conference room switching enable/disable designating operation.

Next, with reference to a flow chart shown in FIG. 39, the operation of the control unit 1106' corresponding to an occurrence of (4) an automatic conference room switching enable/disable designating event will be described.

With the operating unit 1301 of the television conference terminal unit 1200' at a particular conference room, when the user performs an automatic conference room switching enable/disable operation, the control unit 1106' determines whether or not the operating conference room has been designated to the independent designating mode or the NS/PS designating mode with respect to the mode management table (at step S251).

When the operating conference room has been designated to the independent designating mode, the control unit 1106' rewrites the mode management table so that the automatic conference room switching enable/disable designating flag of the conference room represents the reverse status. In other words, if the flag has been set to "enable", the control unit 1106' changes the status to "disable", whereas if the flag has been set to "disable", the control unit 1106' changes the status to "enable" (at the step S252).

When the operating conference room has been designated to the NS/PS designating mode (at the step S251), since the automatic conference room switching enable/disable operation is invalid, the control unit 1106' immediately terminates the process.

Thus, when the user at a conference room performs the automatic conference room switching enable/disable operation with the operating unit 1301 of the television conference terminal unit 1200', the user can select a mode for automatically displaying an image of a speaking conference room when it is detected.

Figure 40:
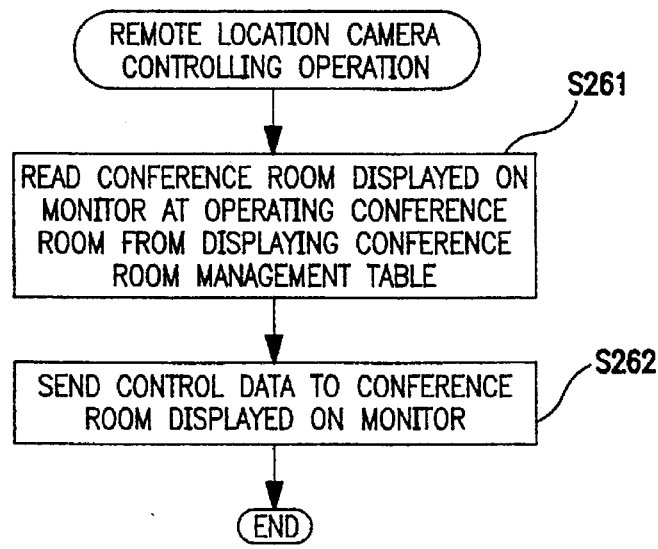
FIG. 40 is a flow chart of remote location camera control operation.

Next, with reference to a flow chart shown in FIG. 40, the operation of the control unit 1106' corresponding to an occurrence of (5) a remote location camera controlling event will be described.

When the user at a conference room performs a remote location camera controlling operation such as rotating a camera or zooming an image thereof with the operating unit 1301 of the television conference terminal unit 1200', the control unit 1106' determines a conference room displayed on the monitor at the operating conference room with reference to the displaying conference room management table (at step S261).

The control unit 1106' sends camera control data to the television conference terminal unit 1200' at the conference room displayed on the monitor 1207 of the television conference terminal unit 1200' at the operating conference room (at step S262).

Thus, the user at any conference room can remotely control a camera 1206 disposed at another conference room displayed on the monitor 1207 of the television conference terminal unit 1200' at the user's conference room so as to display an image of a desired conference room.

A camera 1206 at a conference room that has been designated to the independent designating mode may not be controlled. In addition, the remote location camera control operation may be valid for a conference room that has been designated to the independent designating mode.

Figure 41:
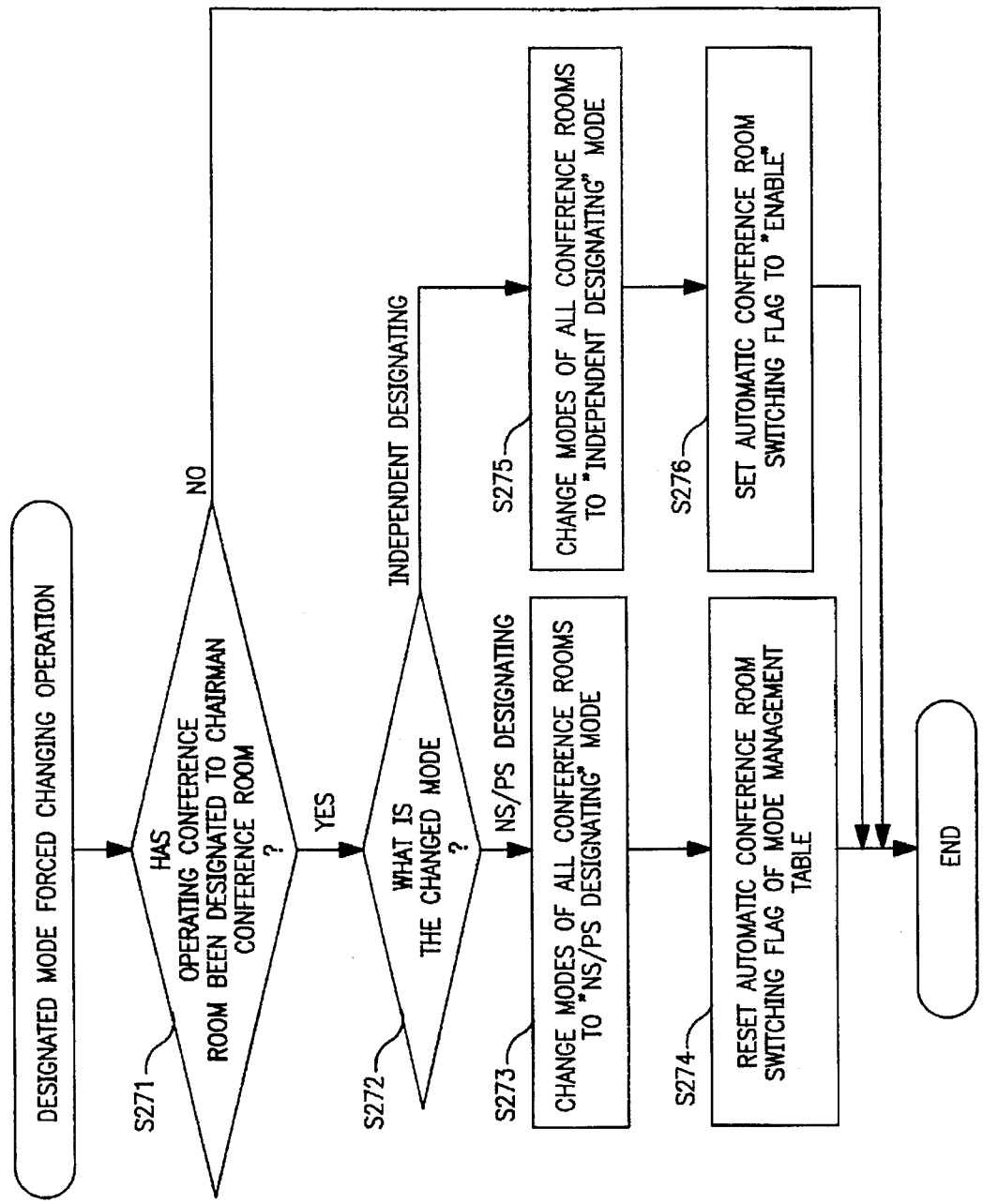
FIG. 41 is a flow chart of designated mode forced changing operation.

Last, with reference to a flow chart shown in FIG. 41, the operation of the control unit 1106' corresponding to an occurrence of (6) a designated mode forced changing event will be described.

When the user at a conference room performs a designated mode forced changing operation (this conference room is referred to as the operating conference room) with an operating unit 1301 of a television conference terminal unit 1200', the control unit 1106' determines whether or not the operating conference room has been designated to a chairman conference room (at step S271).

When the operating conference room has been designated to a chairman conference room, the designated mode to be changed is either the NS/PS designating mode or the independent designating mode (at step S272).

When the operating conference room has been designated to the NS/PS designating mode, the control unit 1106' changes the modes of all other conference rooms in the mode management table to the NS/PS designating mode (at step S273). In addition, the control unit 1106' resets all the automatic conference room switching flags in the mode management table (at step S74).

On the other hand, when the designated mode to be changed is the independent designating mode, the control unit 1106' changes the modes of all other conference rooms in the mode management table to the independent designating mode (at step S275). In addition, the control unit 1106' sets the automatic conference room switching flags of all other conference rooms in the mode management table to "enable" (at step S276).

When the operating conference room has not been designated to a chairman conference room (at step S2761), since this operation is invalid for other than the chairman conference room, the control unit 1106' immediately terminates this process.

Thus, the user at a chairman conference room can forcedly change the modes of all other conference rooms to a desired mode.

The chairman conference room can be designated by i) multi-location control apparatus 1100', to ii) a conference room where a television conference terminal unit 1200' has been connected to the multi-location control apparatus 1100' at first, or the like.

According to this embodiment, when a television conference terminal unit is designated to the independent designating mode and the automatic conference room switching disable mode, images displayed on the monitor thereof are not switched by an operation at another conference room or when a speaking conference room is detected. In addition, at a chairman conference room, modes of all other conference rooms can be forcedly changed. Thus, the multi-location television conference system according to this embodiment can manage a multi-location conference in a manner similar to a real conference.

Moreover, even in the independent designating mode, an automatic switching mode for an image of a speaking conference room can be selected. Thus, when an important speech is made at another conference room, this speech can be heard at a conference room that has been designated to the independent designating mode.

FIG. 42 is a block diagram showing an overall construction of a multi-location television conference system according to a third embodiment of the present invention.

A multi-location control apparatus 3100 is connected to television conference terminal units 3200A, 3200B, ..., and 3200Z at locations A, B, ..., and Z through a dedicated line, subscriber line (such as ISDN), or the like.

The multi-location control apparatus 3100 switches and controls image data of all the conference rooms received from the television conference terminal units 3200A, 3200B, ..., and 3200Z and distributes image data received from a particular television conference terminal unit to television conference terminal units 3200 at other conference rooms.

In this embodiment, when the multi-location control apparatus 3100 distributes image data of a particular conference room to other conference rooms, the apparatus 3100 sends information with respect to the location name of the transmitting conference room as an image or code that is multiplexed with the image data of the transmitting conference room. Thus, as shown in FIG. 43, a monitor of each of the television conference terminal units 3200 displays a superimposed image of the transmitting conference room and the information (location name thereof).

Figure 44:
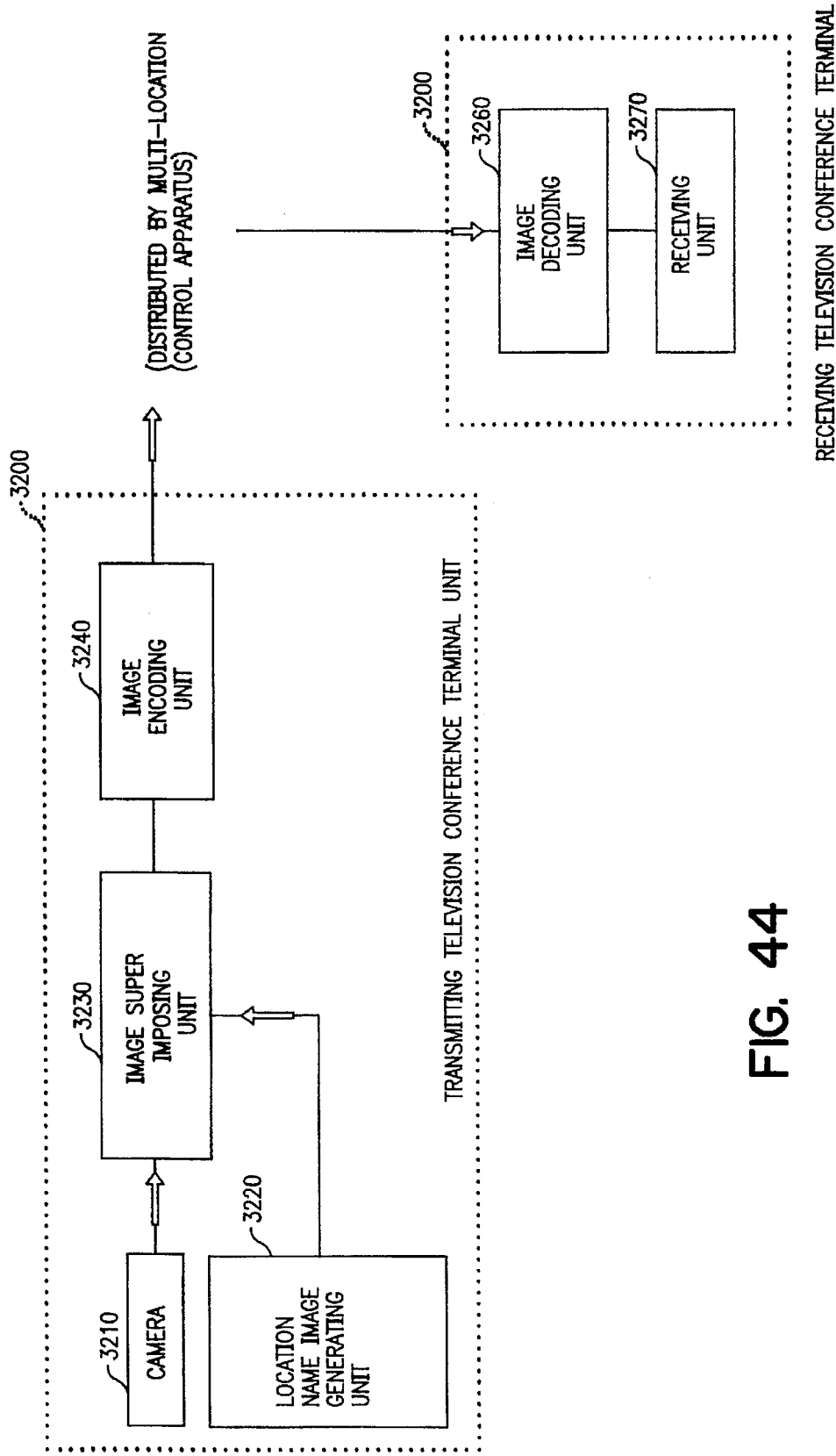
FIG. 44 is a block diagram showing an example of a construction of a first system according to the third embodiment.

FIG. 44 is a block diagram showing an example of a construction of a first system that accomplishes such a display system.

An image transmitting system of the television conference terminal unit 3200 comprises a camera 3210, a location name image generating unit 3220, an image superimposing unit 3230, and an image encoding unit 3240.

The camera 3210 photographs an image of a conference room and outputs an image signal (for example, NTSC signal or PAL signal) to the image superimposing unit 3230. The location name image generating unit 3220 generates an image of a location name of the conference room and outputs the image signal to the image superimposing unit 3230.

The image superimposing unit 3230 superimposes the location name image signal, which has been received from the location name image generating unit 3220 over a predetermined part of the image signal of the conference room, which has been received from the camera 3210, and outputs the superimposed signal, which is an image signal, to the image encoding unit 3240.

The image encoding unit 3240 encodes the superimposed image signal to digital data. The digital data is sent to the multi-location control apparatus 3100 through a network interface (not shown). The image encoding unit 3240 encodes the image signal corresponding to a predetermined encoding technique for example CCITT Recommendation H. 261 (NTSC signal, PAL signal, or the like).

The multi-location control apparatus 3100 switches and controls digital encoded data of images received from the television conference terminal units 3200 at conference rooms and distributes the selected data to the television conference terminal units 3200 at other conference rooms.

An image receiving system of the television conference terminal unit 3200 comprises an image decoding unit 3260 and a receiving monitor 3280.

The image decoding unit 3260 decodes digital encoded data received from the multi-location control apparatus 3100 to an original image signal (NTSC signal, PAL signal, or the like) and outputs the decoded signal to the receiving monitor 3270.

The receiving monitor 3270 displays an image where the location name has been superimposed over the image of the conference room.

Figure 45:
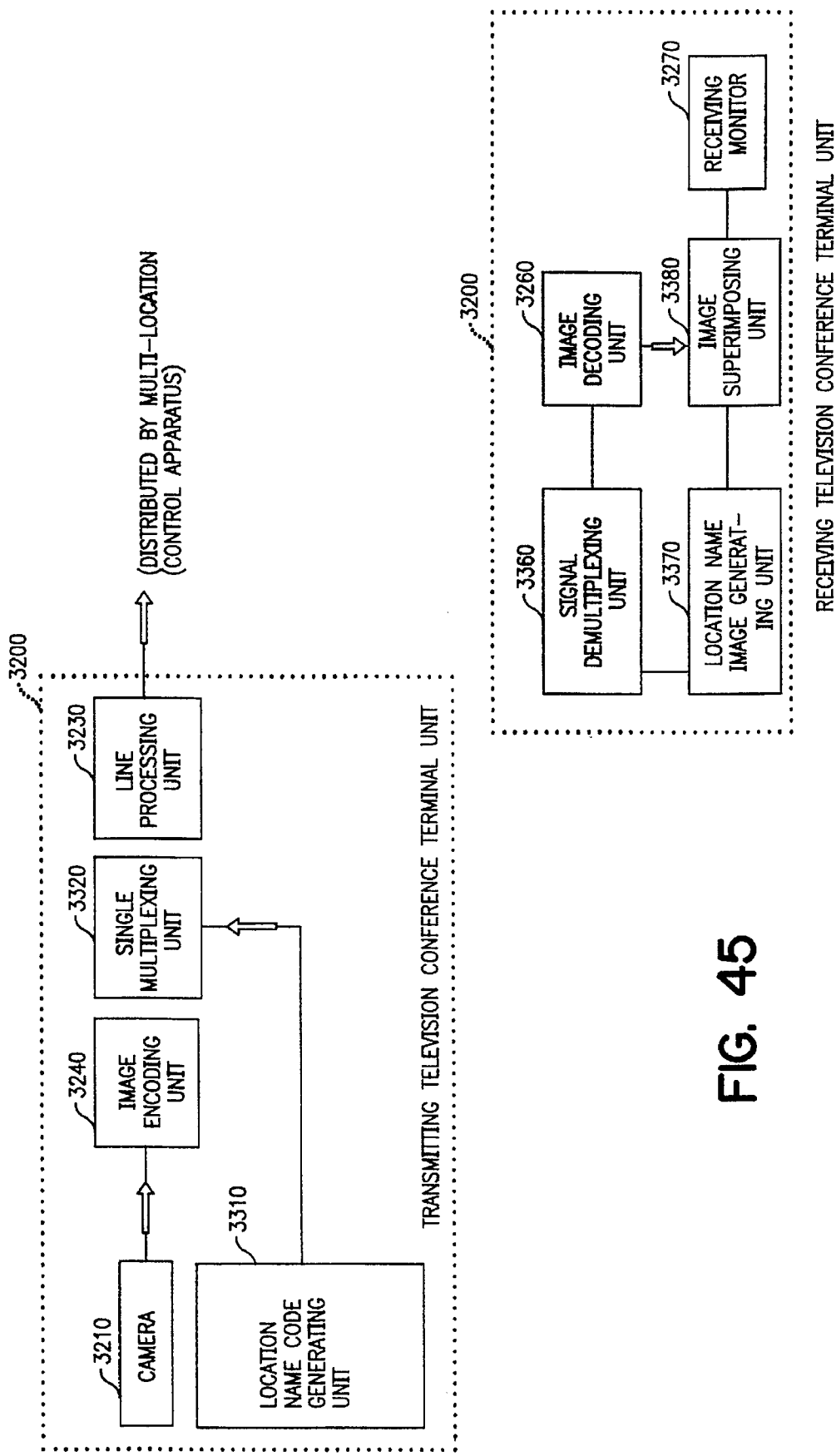
FIG. 45 is a block diagram showing an example of a construction of a second system according to the third embodiment.

FIG. 45 is a block diagram showing an example of a construction of a second system according to the third embodiment of the present invention.

An image transmitting system of a television conference terminal unit 3200 of this system comprises a location name code generating unit 3310, a signal multiplexing unit 3320, and a line processing unit 3330, in addition to the above-described camera 3210 and image encoding unit 3240.

The camera 3210 photographs an image of the conference room and outputs the resultant image signal to the image encoding unit 3240. The image encoding unit 3240 encodes the image signal to a digital encoded signal and outputs the encoded signal to the signal multiplexing unit 3320.

The location name code generating unit 3310 generates a location name code (character code) of the conference room and outputs the location name code to the signal multiplexing unit 3320.

The signal multiplexing unit 3320 multiplexes the encoded signal of the image of the conference room, which has been input from the image encoding unit 3240, with the location name code, which has been received from the location name code generating unit 3310, and outputs the multiplexed signal to the line processing unit 3330.

The line processing unit 3330 transmits the multiplexed data to the multi-location control apparatus 3100.

The multi-location control apparatus 3100 receives the multiplexed data from television conference terminal units 3200 at conference rooms and distributes the multiplexed data to the television conference terminal units 3200 at the conference rooms.

An image receiving system of the television conference terminal unit 3200 comprises a signal demultiplexing unit 3360 and a location name image generating unit 3370, in addition to the above-described image decoding unit 3260, image superimposing unit 3380, and receiving monitor 3270.

The signal demultiplexing unit 3360 demultiplexes the multiplexed data into digital encoded data of an image of a conference room and a location name code. The digital encoded data and the location name code are output to the image decoding unit 3260 and the location name image generating unit 3370, respectively.

The location name image generating unit 3370 generates a location name image signal corresponding to the received location name code and outputs the image signal to the image superimposing unit 3380.

The image superimposing unit 3380 superimposes the location name image signal over the image signal of the conference room received from the image decoding unit 3360 and outputs the superimposed signal, which is an image signal, to the receiving monitor 3270.

The receiving monitor 3270 displays the superimposed image, where the location name of the conference room has been superimposed over the image of the conference room.

Figure 46:
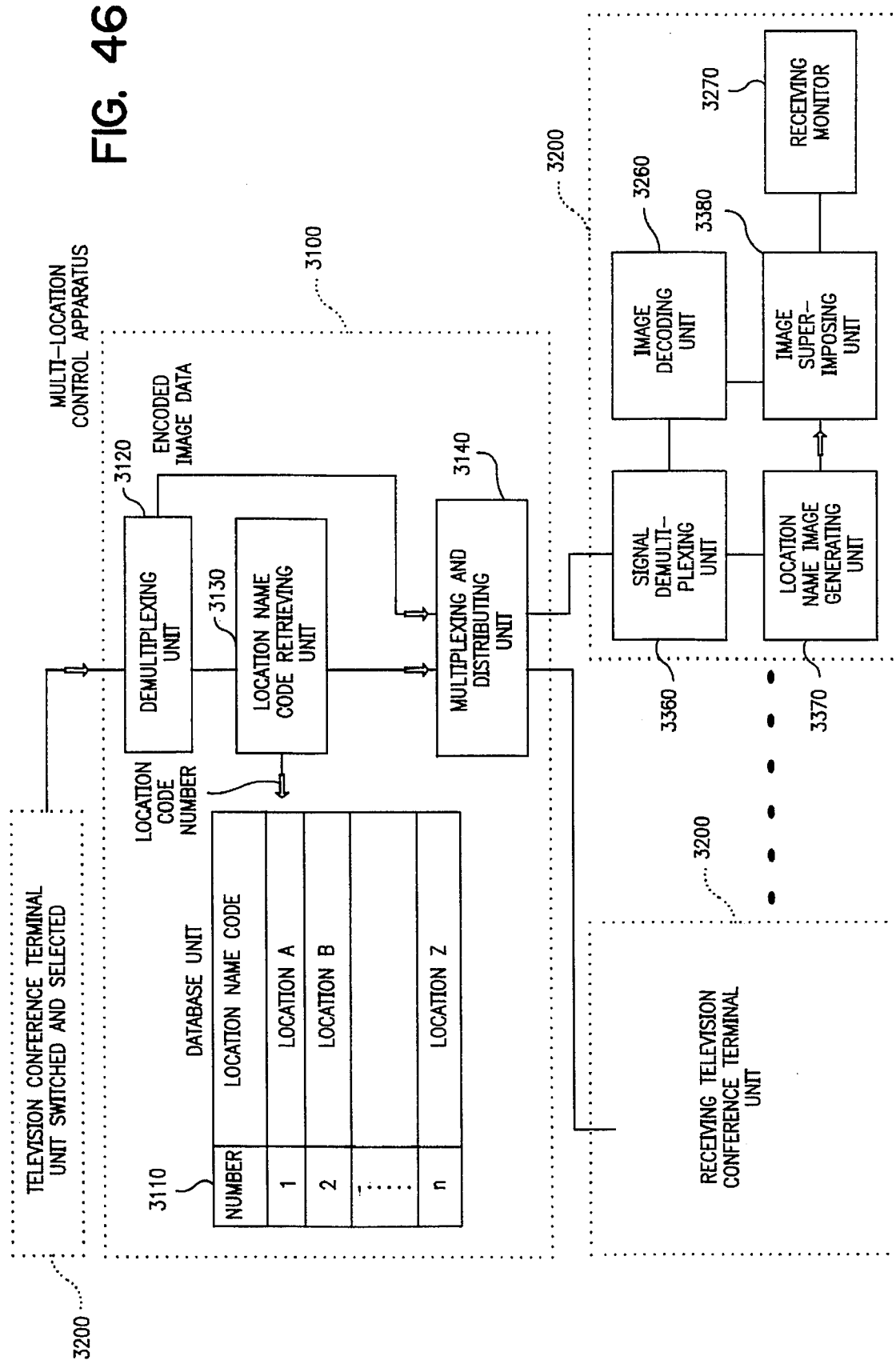
FIG. 46 is a block diagram showing an example of a construction of a third system according to the third embodiment.

FIG. 46 is a block diagram showing an example of a construction of a third system according to the third embodiment.

An image transmitting system of the television conference terminal unit 3200 of each conference room multiplexes a location number designated to the conference room with encoded data of an image signal of the conference room and transmits the multiplexed signal to the multi-location control apparatus 3100. In other words, the image transmitting system of the third system has a location number generating unit (not shown) that generates a location number instead of the location name code generating unit 3310 of the second system.

The multi-location control apparatus 3100 comprises a database unit 3110, a demultiplexing unit 3120, a location name code retrieving unit 3130, and a multiplexing and distributing unit 3140. The database unit 3110 stores location name codes corresponding to location numbers 1, 2, . . ., and n at the conference rooms.

The demultiplexing unit 3120 demultiplexes the multiplexed data, where the image data of the conference room has been multiplexed with the location number into an image signal encoded data and a location number. The location number and the image signal encoded data are output to the code retrieving unit 3130 and the multiplexing and distributing unit 3140, respectively.

The location name code retrieving unit 3130 retrieves a location name code corresponding to the location number from the database unit 3110 and outputs the location name code to the multiplexing and distributing unit 3140.

The multiplexing and distributing unit 3140 multiplexes the location name code with the image signal encoded data of the conference room and distributes the multiplexed signal to the television conference terminal units 3200 at the conference rooms.

An image receiving system of the television conference terminal unit 3200 has a construction similar to that of the second system. As with the second system, a receiving monitor 3270 displays a superimposed image, where the location name has been superimposed over the image of the conference room.

Figure 47:
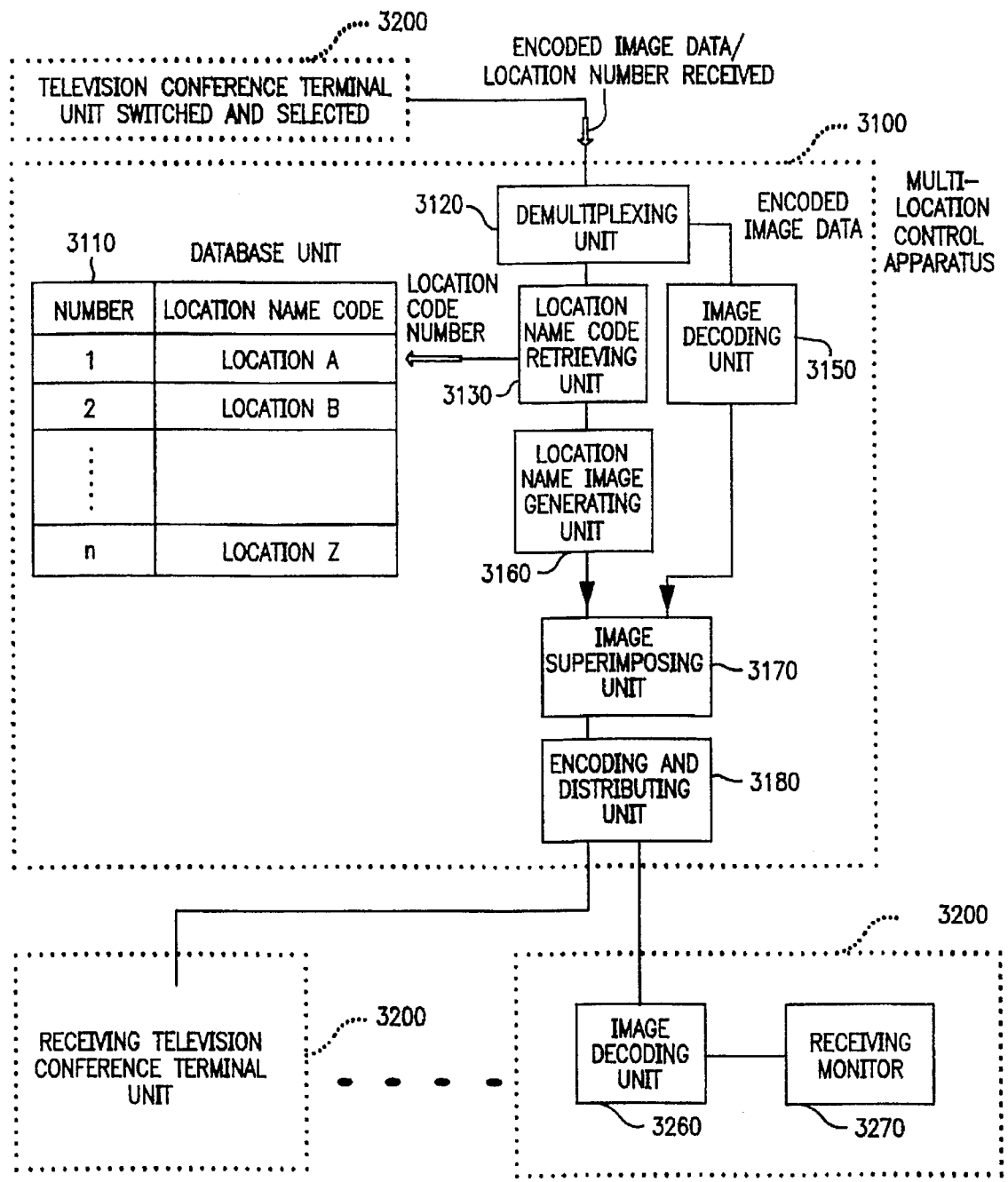
FIG. 47 is a block diagram showing an example of a construction of a fourth system according to the third embodiment.

FIG. 47 is a block diagram showing an example of a construction of a fourth system according to the third embodiment of the present invention.

The construction of an image transmitting system of a television conference terminal unit 3200 of the fourth system is similar to that of the above-described third system.

The multi-location control apparatus 3100 of the fourth system comprises an image decoding unit 3150, a location name image generating unit 3160, an image superimposing unit 3170, and an encoding and distributing unit 3180, in addition to the above-described database unit 3110, demultiplexing unit 3120, and location code retrieving unit 3130 as with the construction of the third system.

The image decoding unit 3150 decodes encoded data received from the demultiplexing unit 3120 to an image signal of the conference room, which has been switched and selected, and outputs the decoded signal to the image superimposing unit 3170.

The location name image generating unit 3160 generates an image signal of the location name corresponding to the location name code received from the location name code retrieving unit 3130 and outputs the image signal to the image superimposing unit 3170.

The image superimposing unit 3170 superimposes the image signal of the location name over a predetermined part of the image signal of the conference room. In addition, the image superimposing unit 3170 outputs the superimposed image signal to the encoding and distributing unit 3180.

The encoding and distributing unit 3180 encodes the superimposed image signal corresponding to an encoding technique, for example, CCITT Recommendation H. 261 and distributes the encoded signal to the television conference terminal units 3200 at the conference rooms.

An image receiving system of the television conference terminal unit 3200 at each conference room has a construction similar to that of the first system. The image receiving system comprises the image decoding unit 3260 and the receiving monitor 3270. The image decoding unit 3260 decodes the encoded data of the image signal received from the multi-location control apparatus 3100 into the image of the conference room and the location name thereof, which have been switched and selected. The monitor 3270 displays the superimposed image, where the location name of the conference room has been superimposed over the image of the conference room.

In addition, the present invention may be applied to the following system.

(1) The multi-location control apparatus receives encoded image data of a conference room and a location code thereof from each television conference terminal unit. The multi-location control apparatus decodes the encoded image data of the conference room to an image signal and generates an image signal of a location name corresponding to the location code. Thereafter, the multi-location control apparatus generates an image signal where the image signal of the location name has been superimposed over the image signal of the conference room, encodes the superimposed image signal, and distributes the encoded signal to each television conference terminal unit.

Each television conference terminal unit decodes the encoded data to an image signal and displays an image where the location name has been superimposed over the image of the conference room on the monitor.

(2) The television conference terminal unit multiplexes the encoded image data of the conference room and the location number and transmits the multiplexed signal to the multi-location control apparatus.

The multi-location control apparatus distributes the multiplexed data to the television conference terminal unit as it is.

The television conference terminal unit demultiplexes the multiplexed data of the conference room and location number into encoded image data thereof. Next, the television conference terminal unit decodes the encoded image data of the conference room to the image signal and generates the image signal of the location name corresponding to the location number. In addition, the television conference terminal unit superimposes the image signal of the location name over the image signal of the conference room. Thus, a monitor of the television conference terminal unit displays an image where the location name has been superimposed over the image of the conference room.

In this embodiment, the image of the location name is superimposed over the image of the conference room. However, the present invention is not limited to this method. Instead, background information (such as the name of a speaking attendant and his/her title) at a conference room may be superimposed over an image of the conference room.

According to the present invention, when speeches are detected at a plurality of locations, image data that contain images of these speaking locations in one screen are generated and distributed to each television conference terminal unit. Thus, when a discussion is performed at a plurality of locations, images of the speaking locations can be displayed at a time. In addition, the number of images of locations displayed on the screen varies as the number of speaking locations varies. Thus, images with reality can be displayed. Moreover, even if a plurality of speeches are made at the same time, since these locations are displayed on the same screen, speaking locations can be easily identified.

At each listening location, images of only speaking locations are displayed. Thus, at each listening location, speaking locations can be immediately identified.

At each speaking location, since images of other speaking locations and an image of a former speaking location are displayed on the same screen. Thus, at each speaking location, other speaking locations can be easily identified.

Since image data switched and selected are output to each television conference terminal unit independent from other television conference terminal units, at each television conference terminal unit, an image of a desired conference room can be selected without necessity to switch monitor images displayed at other television conference terminal units. In addition, images displayed at each television conference terminal unit are not switched by an operation at another conference room.

At each conference room, a first mode that can select an image of a desired conference room independent from other conference rooms or a second mode that can switch an image of each conference room corresponding to a detection of a speaking location, by an operation at another television conference terminal unit, or the like can be selected. Thus, the mode where an image displayed is not switched by an operation at another conference room, corresponding to a detection of a speaking location, or the like (first mode) or the mode where an image displayed is automatically switched (second mode) can be selected. Consequently, images can be displayed depending on the situations.

Even in the first mode, a mode that automatically displays an image of a conference room corresponding to a detection of a speaking location can be selected. Thus, speeches can be securely heard.

At a conference room that has been designated to a main conference room, modes of other conference rooms can be designated when necessary. Thus, a conference similar to a real conference, which is managed by a chairman, can be accomplished.

A camera at a conference room whose image is displayed can be remotely controlled from another conference room. Thus, a desired image of the conference room can be obtained by controlling the zooming and orientation of the camera.

Since information with respect to an image of a conference room, which includes, for example, the location name of the conference room, the name of the speaking attendant at the conference room, and the title of the speaking attendant, can be displayed, the conference can be smoothly progressed.

What is claimed is:

1. A multi-location control apparatus for use with a multi-location television conference system that has a plurality of multi-location television conference terminal units disposed at at least three locations, each of said television conference terminal units for transmitting and receiving sound data and image data, said multi-location control apparatus for receiving the sound data and the image data from all of said television conference terminal units and for transmitting the sound data and the image data to said television conference terminal units, said multi-location control apparatus comprising:

speaking location detecting means for detecting a speaking location corresponding to sound signals that are output from sound input means of each of said television conference terminal units;

image combining means for designing a layout of a display area corresponding to the number of speaking locations for each television conference terminal unit and generating the image data containing images of the speaking locations to be displayed in the designed display area of each television conference terminal unit when a plurality of speaking locations are detected by said speaking location detecting means; and image distributing means for transmitting image data generated by said image combining means to each of said television conference terminal units for display on said each of said television conference terminal units.

2. The multi-location control apparatus as set forth in claim 1, wherein said image combining means generates and transmits the image data of the speaking locations detected by said speaking location detecting means to ones of said television conference terminal units at listening locations where sound is not detected by said speaking location detecting means, the transmitted image data of all of the speaking locations being simultaneously displayed on a single screen of each of the television conference terminal units of the listening locations, and wherein said image distributing means distributes the image data of the speaking locations to the television conference terminal units of the listening locations.

3. The multi-location control apparatus as set forth in claim 1, wherein said image combining means generates the image data of other speaking locations and a former speaking location for each of the speaking locations, the image data being contained in one screen of each speaking location, and wherein said image distributing means transmits the image data of the other speaking locations to television conference terminal units of the speaking locations.

4. A multi-location television conference system having a plurality of television conference terminal units and comprising:

speaking location detecting means for detecting a speaking location corresponding to sound signals that are output from sound input means of each of said television conference terminal units;

image combining means for designing a layout of a display area corresponding to the number of speaking locations for each television conference terminal unit and generating the image data containing images of the speaking locations to be displayed in the designed display area of each television conference terminal unit when a plurality of speaking locations are detected by said speaking location detecting means; and image distributing means for transmitting image data generated by said image combining means to each of said television conference terminal units for display on said each of said television conference terminal units.

5. The multi-location television conference system as set forth in claim 4, wherein said image combining means generates and transmits the image data of the speaking locations detected by said speaking location detecting means to ones of said television conference terminals at listening locations where sound is not detected by said speaking location detecting means, the transmitted image data of all of the speaking locations being simultaneously displayed on a single screen of each of the television room units of the listening locations, and wherein said image distributing means distributes the image data of the speaking locations to the television conference terminal units of the listening locations.

* * * * *